US011902989B2

(12) United States Patent
Liu et al.

(10) Patent No.: US 11,902,989 B2
(45) Date of Patent: Feb. 13, 2024

(54) MULTICAST BROADCAST SERVICES CONTROL CHANNEL RELIABILITY

(71) Applicant: QUALCOMM Incorporated, San Diego, CA (US)

(72) Inventors: Le Liu, Fremont, CA (US); Mostafa Khoshnevisan, San Diego, CA (US); Alberto Rico Alvarino, San Diego, CA (US); Kazuki Takeda, Tokyo (JP); Prasad Reddy Kadiri, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 17/393,231

(22) Filed: Aug. 3, 2021

(65) Prior Publication Data
US 2023/0039536 A1 Feb. 9, 2023

(51) Int. Cl.
*H04W 4/00* (2018.01)
*H04W 72/23* (2023.01)
*H04W 72/30* (2023.01)

(52) U.S. Cl.
CPC ........... *H04W 72/23* (2023.01); *H04W 72/30* (2023.01)

(58) Field of Classification Search
None
See application file for complete search history.

(56) References Cited

U.S. PATENT DOCUMENTS

| 2022/0095317 | A1* | 3/2022 | Papasakellariou | .... H04L 5/0053 |
| 2022/0272706 | A1* | 8/2022 | Sengupta | .............. H04W 52/18 |

OTHER PUBLICATIONS

Intel Corporation: "DL Signals and Channels for NR-unlicensed", R1-1904283, 3GPP TSG RAN WG1 Meeting #96bis,—INTEL—DL Channel, 3rd Generation Partnership Project, Mobile Competence Centre, 650, Route Des Lucioles, F-06921 Sophia-Antipolis Cedex, France, vol. RAN WG1, No. Xl'an, China, Apr. 8, 2019-Apr. 12, 2019, Mar. 30, 2019, XP051691408, p. 2-p. 3, figure 2, 5 Pages.
International Search Report and Written Opinion—PCT/US2022/038301—ISA/EPO—dated Dec. 2, 2022.

(Continued)

*Primary Examiner* — Zewdu A Beyen
(74) *Attorney, Agent, or Firm* — Holland & Hart LLP

(57) ABSTRACT

Methods, systems, and devices for wireless communications are described. The method includes receiving, from a base station and at the UE of a group of UEs, control signaling indicating a link between a first search space set and a second search space set used for a multicast broadcast service, where a first downlink control channel for the group of UEs is transmitted in the first search space set and a second downlink control channel is transmitted in the second search space set, monitoring the first search space set for a first instance of control information in the first downlink control channel and the second search space set for a second instance of the control information in the second downlink control channel, and decoding the first instance or the second instance of the control information, or both, based on the monitoring.

30 Claims, 13 Drawing Sheets

(56) References Cited

OTHER PUBLICATIONS

LG Electronics Inc: "Support of Group scheduling for RRC_CONNECTED UEs", R1-2105437, 3GPP TSG RAN WG1 Meeting #104B-e, 3rd Generation Partnership Project, Mobile Competence Centre, 650, Route Des Lucioles, F-06921 Sophia-Antipolis Cedex, France, vol. RAN WG1, No. Online, Apr. 12, 2021, Apr. 20, 2021, May 12, 2021, XP052011450, p. 5-p. 7, 15 Pages.

Moderator (CMCC): "Summary#4 on Mechanisms to Support Group Scheduling for RRC_CONNECTED UEs for NR MBS", 3GPP TSG RAN WGI #105-e, R1-2106126, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 24, 2021, XP052013826, p. 28, pp. 1-100.

\* cited by examiner

MULTICAST BROADCAST SERVICES CONTROL CHANNEL RELIABILITY

FIELD OF TECHNOLOGY

The following relates to wireless communications, including multicast broadcast services control channel reliability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support multicast broadcast services. In some cases, it may be desirable to improve the control channel reliability of wireless systems that support multicast broadcast services.

SUMMARY

The described techniques relate to improved methods, systems, devices, and apparatuses that support multicast broadcast services control channel reliability. Generally, the described techniques provide for a user equipment (UE) receiving, from a base station, control signaling indicating a link between a first search space set and a second search space set used for a multicast broadcast service to a group of UEs (e.g., group of multicast broadcast services UEs) that include the UE. In some cases, the first search space set may include a first downlink control channel configured for the group of UEs and the second search space set including a second downlink control channel. In some cases, the second search space set may be configured for the group of UEs or may be UE-specific. The described techniques also provide for the UE monitoring the first search space set for a first instance of control information in the first downlink control channel, and monitoring the second search space set for a second instance of the control information in the second downlink control channel. The described techniques also provide for the UE decoding the first instance or the second instance of the control information, or both, based on the monitoring.

A method for wireless communication at a user equipment (UE) is described. The method may include receiving, from a base station and at the UE of a group of UEs, control signaling indicating a link between a first search space set and a second search space set used for a multicast broadcast service, where a first downlink control channel for the group of UEs is transmitted in the first search space set and a second downlink control channel is transmitted in the second search space set, monitoring the first search space set for a first instance of control information in the first downlink control channel and the second search space set for a second instance of the control information in the second downlink control channel, and decoding the first instance or the second instance of the control information, or both, based on the monitoring.

An apparatus for wireless communication at a UE is described. The apparatus may include a processor, memory coupled with the processor, and instructions stored in the memory. The instructions may be executable by the processor to cause the apparatus to receive, from a base station and at the UE of a group of UEs, control signaling indicating a link between a first search space set and a second search space set used for a multicast broadcast service, where a first downlink control channel for the group of UEs is transmitted in the first search space set and a second downlink control channel is transmitted in the second search space set, monitor the first search space set for a first instance of control information in the first downlink control channel and the second search space set for a second instance of the control information in the second downlink control channel, and decode the first instance or the second instance of the control information, or both, based on the monitoring.

Another apparatus for wireless communication at a UE is described. The apparatus may include means for receiving, from a base station and at the UE of a group of UEs, control signaling indicating a link between a first search space set and a second search space set used for a multicast broadcast service, where a first downlink control channel for the group of UEs is transmitted in the first search space set and a second downlink control channel is transmitted in the second search space set, means for monitoring the first search space set for a first instance of control information in the first downlink control channel and the second search space set for a second instance of the control information in the second downlink control channel, and means for decoding the first instance or the second instance of the control information, or both, based on the monitoring.

A non-transitory computer-readable medium storing code for wireless communication at a UE is described. The code may include instructions executable by a processor to receive, from a base station and at the UE of a group of UEs, control signaling indicating a link between a first search space set and a second search space set used for a multicast broadcast service, where a first downlink control channel for the group of UEs is transmitted in the first search space set and a second downlink control channel is transmitted in the second search space set, monitor the first search space set for a first instance of control information in the first downlink control channel and the second search space set for a second instance of the control information in the second downlink control channel, and decode the first instance or the second instance of the control information, or both, based on the monitoring.

Some examples of the method, apparatuses, and non-transitory computer-readable medium described herein may further include operations, features, means, or instructions for combining at least a portion of the first instance the control information with at least a portion of the second instance of the control information based on the monitoring, where decoding the first instance or the second instance of the control information may be based on the combining.

Some examples of the method, apparatuses, and non-transitory computer-readable medium described herein may further include operations, features, means, or instructions for receiving one or more signals in a common frequency resource that may be configured within a dedicated unicast bandwidth part associated with the multicast broadcast service, where monitoring the first search space set and the second search space set may be based on receiving the one or more signals in the common frequency resource.

In some examples of the method, apparatuses, and non-transitory computer-readable medium described herein, the common frequency resource includes the first search space set, the first search space set includes a first common search space, and the first downlink control channel includes a first group common physical downlink control channel associated with the group of UEs.

In some examples of the method, apparatuses, and non-transitory computer-readable medium described herein, the common frequency resource includes the second search space set, the second search space set includes a second common search space, and the second downlink control channel includes a second group common physical downlink control channel associated with the group of UEs.

In some examples of the method, apparatuses, and non-transitory computer-readable medium described herein, the second search space set includes a second common search space configured in the dedicated unicast bandwidth part, and the second downlink control channel includes a UE-specific physical downlink control channel.

In some examples of the method, apparatuses, and non-transitory computer-readable medium described herein, the second search space set includes a UE-specific search space configured in the dedicated unicast bandwidth part, and the second downlink control channel includes a UE-specific physical downlink control channel.

In some examples of the method, apparatuses, and non-transitory computer-readable medium described herein, a monitoring priority of the first common search space may be determined based on search space indexes of one or more type-X common search spaces or one or more UE-specific search spaces, or both, the one or more type-X common search spaces including at least the first common search space.

Some examples of the method, apparatuses, and non-transitory computer-readable medium described herein may further include operations, features, means, or instructions for receiving one or more signals in a common frequency resource that may be associated with the multicast broadcast service, the common frequency resource including the first search space set, where the first downlink control channel includes a first group common physical downlink control channel.

In some examples of the method, apparatuses, and non-transitory computer-readable medium described herein, the common frequency resource includes the second search space set, and the second downlink control channel includes a second group common physical downlink control channel associated with the group of UEs.

Some examples of the method, apparatuses, and non-transitory computer-readable medium described herein may further include operations, features, means, or instructions for receiving one or more signals in a second common frequency resource that may be configured within the dedicated unicast bandwidth part, the second common frequency resource including the second search space set, where the second downlink control channel includes a second group common physical downlink control channel.

In some examples of the method, apparatuses, and non-transitory computer-readable medium described herein, the second search space set includes a second common search space configured in the dedicated unicast bandwidth part, and the second downlink control channel includes a UE-specific physical downlink control channel.

In some examples of the method, apparatuses, and non-transitory computer-readable medium described herein, the second search space set includes a UE-specific search space configured in the dedicated unicast bandwidth part, and the second downlink control channel includes a UE-specific physical downlink control channel.

In some examples of the method, apparatuses, and non-transitory computer-readable medium described herein, the common frequency resource may be broadcasted in a system information block to enable the UE to detect a multicast broadcast control channel, or the common frequency resource may be broadcasted in the multicast control channel to enable the UE to detect a multicast broadcast traffic channel.

Some examples of the method, apparatuses, and non-transitory computer-readable medium described herein may further include operations, features, means, or instructions for identifying the link between the first search space set and the second search space set based on downlink control channel candidate indexes for the first search space set and the second search space set, where monitoring the first search space set and the second search space set may be based on identifying the link.

Some examples of the method, apparatuses, and non-transitory computer-readable medium described herein may further include operations, features, means, or instructions for identifying the link between the first search space set and the second search space set based on control channel element indexes for the first search space set and the second search space set, where monitoring the first search space set and the second search space set may be based on identifying the link.

In some examples of the method, apparatuses, and non-transitory computer-readable medium described herein, a UE group configuration included in the control signaling indicates that the first search space set and the second search space set may be linked.

Some examples of the method, apparatuses, and non-transitory computer-readable medium described herein may further include operations, features, means, or instructions for receiving one or more signals over a downlink shared channel using parameters associated with the multicast broadcast service based on the link between the first search space set and the second search space set and the first downlink control channel including a group common physical downlink control channel and the second downlink control channel including a UE-specific physical downlink control channel.

In some examples of the method, apparatuses, and non-transitory computer-readable medium described herein, a scrambling of the downlink shared channel may be based on a reference scrambling, and the reference scrambling includes a group radio network temporary identifier associated with the group common physical downlink control channel.

In some examples of the method, apparatuses, and non-transitory computer-readable medium described herein, the second downlink control channel includes a same downlink control information format as the first downlink control channel.

In some examples of the method, apparatuses, and non-transitory computer-readable medium described herein, the group of UEs includes a multicast broadcast services group of UEs, and each UE of the group of UEs may be configured for control signaling repetition.

In some examples of the method, apparatuses, and non-transitory computer-readable medium described herein, the control signaling includes radio resource control, or downlink control information, or media access control control element, or a combination thereof.

In some examples of the method, apparatuses, and non-transitory computer-readable medium described herein, the first search space set and the second search space set include a same periodicity, a same number of monitoring occasions per slot, or a same number of candidates for each aggregation level, or any combination thereof.

In some examples of the method, apparatuses, and non-transitory computer-readable medium described herein, the first downlink control channel and the second downlink control channel include a same downlink control channel candidate index, a same control channel element index, a same aggregation level, a same downlink control information payload, same downlink control information formats to monitor, same coded bits, or same search space type, or any combination thereof.

DETAILED DESCRIPTION

Figure 1:
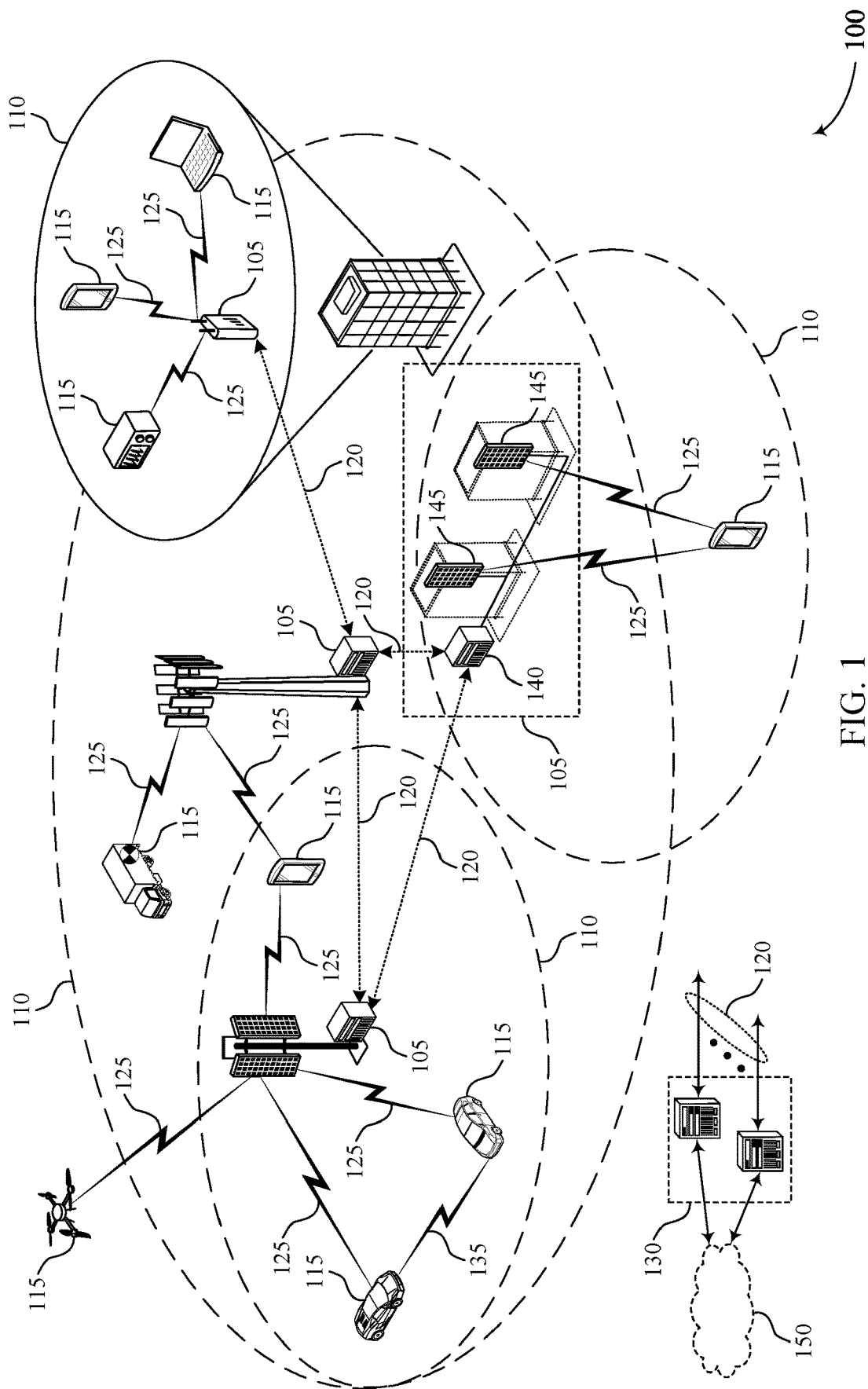
FIG. 1 illustrates an example of a wireless communications system that supports multicast broadcast services control channel reliability in accordance with aspects of the present disclosure.

The present techniques include multicast broadcast services control channel reliability. Repetitive physical downlink control channel (PDCCH) may be utilized to extend control channel coverage. The PDCCH may be configured to repeat in adjacent or non-adjacent slots per monitoring occasion of corresponding search space. The PDCCH may carry control information such as a grant that schedules a channel for a wireless device, such that the wireless device receives instructions for scheduling a channel at a scheduled slot. A user equipment (UE) may receive control information in a repetitive PDCCH within a set of slots. The repetitive PDCCH schedules a channel for reception or transmission by the UE. In some cases, the UE may determine (e.g., based on the control information) a scheduled slot index for the channel scheduled by the repetitive PDCCH.

In some systems, repetitive PDCCH transmissions may be configured under a dedicated bandwidth part for a single UE. However, some systems may not support repetitive PDCCH transmissions for a group of UEs that may be part of a multicast/broadcast services (MBS). In some cases, some systems may not support repetitive PDCCH transmissions that include group-common PDCCH (GC-PDCCH) transmissions. In some cases, some systems may not support repetitive PDCCH transmissions for a group of UEs (e.g., UEs in the same MBS group). For some systems, repetitive PDCCH transmissions for a group of UEs may be inefficient and unreliable.

The present techniques increase the efficiency and reliability of repetitive PDCCH transmissions for a group of UEs. To increase the reliability of repetitive PDCCH transmissions, the present techniques include configuring PDCCH repetition transmissions for a group of UEs in relation to a common frequency range (CFR) associated with MBS. In some cases, a CFR may include a portion of the frequency resources of a bandwidth part (e.g., dedicated unicast bandwidth part) and the parameter configurations for MBS transmission (e.g., group-common PDSCH configuration, group-common PDCCH configuration, group-common SPS configuration, etc.). In some cases, the group of UEs may include a group of MBS-enabled UEs. In some cases, at least one of the repeated PDCCH transmissions may include a GC-PDCCH transmission.

Accordingly, the reliability of MBS GC-PDCCH transmissions is increased by the present techniques that may include PDCCH transmissions in MBS GC-PDCCH transmissions for a group of UEs (e.g., UEs in the same MBS group). In some cases, the repetitive PDCCH transmissions may be based on a link between two search space sets within a dedicated bandwidth part. A base station may indicate the link via control signaling from a base station to a UE. In some cases, the first search space set may be a search space set and include a GC-PDCCH (e.g., the first PDCCH), while the second search space set may be a second search space set that includes a second GC-PDCCH or a UE-specific PDCCH. In some cases, the repetitive PDCCH transmissions may be based on two PDCCH transmissions being transmitted in the same CFR, transmitted respectively in two different CFRs, or a first PDCCH being transmitted in a CFR and the second PDCCH in the dedicated bandwidth part. In some cases, the linked search space set may be two common search space sets configured in the same CFR or different CFRs. In some cases, the linked search space set may be the first search space set being a common search space set configured in a CFR and the second search space set being a common search space set or a UE-specific search space set configured in the dedicated bandwidth part.

Aspects of the disclosure are initially described in the context of wireless communications systems. Aspects of the disclosure are further illustrated by and described with reference to environments of wireless communications systems that relate to multicast broadcast services control channel reliability. Aspects of the disclosure are further illustrated by and described with reference to apparatus diagrams, system diagrams, and flowcharts that relate to multicast broadcast services control channel reliability.

FIG. 1 illustrates an example of a wireless communications system 100 that supports multicast broadcast services control channel reliability in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may receive, from a base station 105, control signaling indicating a link between a first search space and a second search space used for a multicast broadcast service to a group of UEs (e.g., group of multicast broadcast services UEs) that include the UE 115. In some cases, the first search space may include a first downlink control channel configured for the group of UEs and the second search space including a second downlink control channel. In some cases, the second search space may be configured for the group of UEs or may be UE-specific. In some cases, the UE 115 may monitor the first search space for a first instance of control information in the first downlink control channel, and monitoring the second search space for a second instance of the control information in the second downlink control channel. In some cases, the UE 115 may decode the first instance or the second instance of the control information, or both, based on the monitoring.

Figure 2:
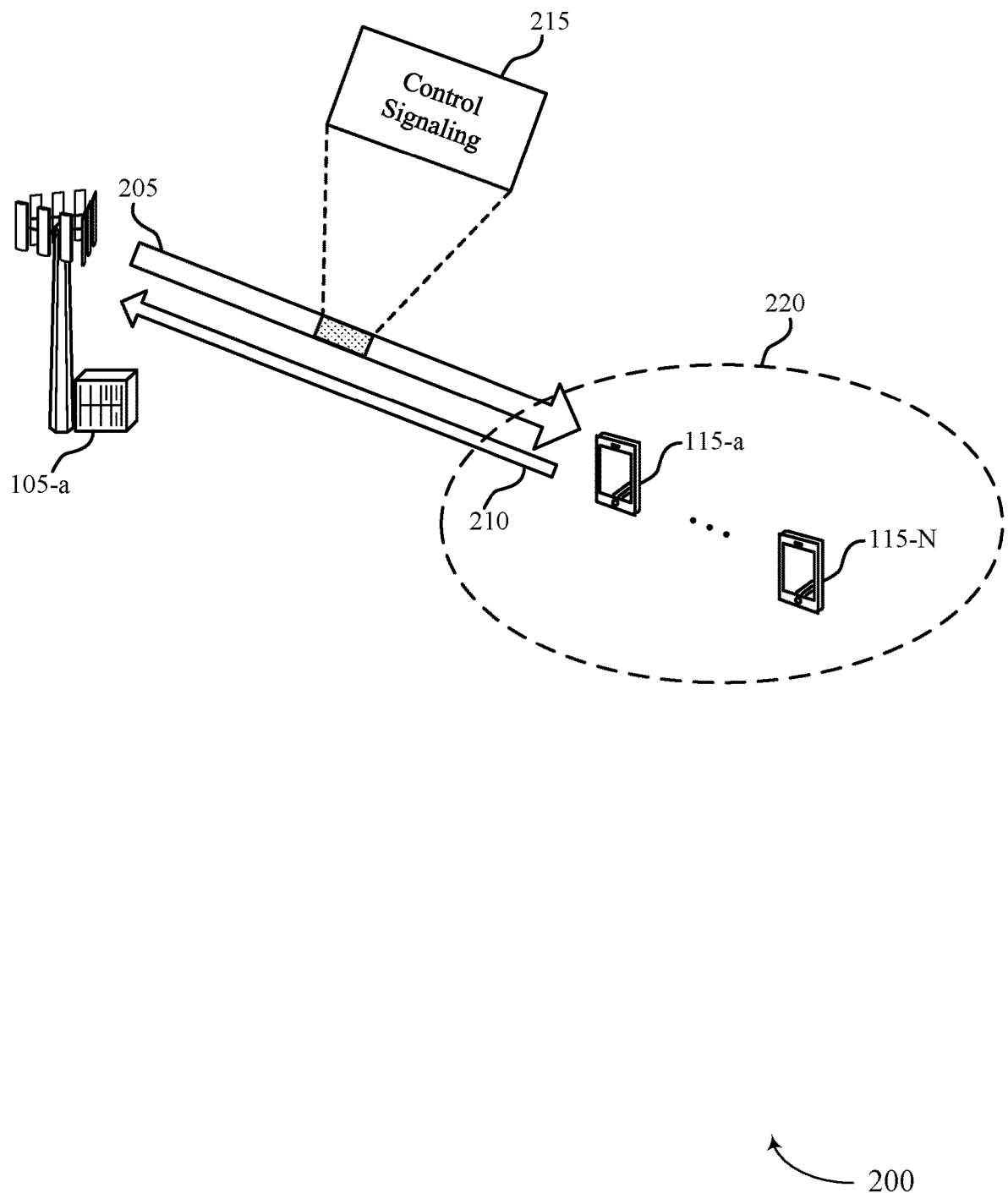
FIG. 2 illustrates an example of a wireless communications system that supports multicast broadcast services control channel reliability in accordance with aspects of the present disclosure.

FIG. 2 illustrates an example of a wireless communications system 200 that supports multicast broadcast services control channel reliability in accordance with aspects of the present disclosure.

The wireless communications system 200 may include UE 115-a and base station 105-a, which may be examples of a UE 115 or a base station 105, as described herein with reference to FIG. 1. Wireless communications system 200 may also include downlink 205 and uplink 210. Base station 105-a may use downlink 205 to convey control and/or data information to UE 115-a. And UE 115-a may use uplink 210 to convey control and/or data information to base station 105-a. In some cases, downlink 205 may use different time and/or frequency resources than uplink 210.

As shown, UE 115-a may be part of a group of UEs 220 (e.g., N UEs from UE 115-a to UE 115-N, where N is a positive integer). In the illustrated example, UE 115-a receiving control and/or data information, transmitting control and/or data information, or performing one or more actions, or any combination thereof, may represent a single UE of the group of UEs 220, a subset of UEs of the group of UEs 220, or all of the UEs of the group of UEs 220 receiving the control and/or data information, transmitting the control and/or data information, or performing the one or more actions, or any combination thereof. In some cases, the group of UEs 220 includes a set of UEs in the same MBS group. In some cases, the group of UEs 220 may be a subset of another group of UEs (e.g., subset of UEs of an MBS group, a subset MBS group of UEs of another MBS group of UEs).

In the illustrated example, base station 105-a may transmit control signaling 215 (e.g., one or more control messages) to UE 115-a via downlink 205. In some cases, control signaling 215 includes RRC, or downlink control information (DCI), or media access control-control element (MAC-CE), or a combination thereof.

One or more UEs or each UE of the group of UEs 220 may be configured for control signaling repetition (e.g., configured to receive repeated PDCCH transmissions, repetitive PDCCH). In some cases, control signaling 215 may indicate a link between a first search space and a second search space used for a multicast broadcast service. In some cases, base station 105-a transmits in the first search space a first downlink control channel for the group of UEs 220 and transmits in the second search space a second downlink control channel, where the second downlink control channel may be for the group of UEs 220 or may be UE-specific (e.g., specific to UE 115-a). In some cases, the second downlink control channel includes a same downlink control information format (e.g., format 1_0, 1_1, 1_2) as the first downlink control channel.

The control signaling 215 may indicate (e.g., via a linking configuration) that the first search space set and the second search space set are linked. In some cases, control signaling 215 includes a downlink control channel candidate index, and where control signaling 215 indicates that the first search space set and the second search space set are linked based on the first search space set and the second search space set each being associated with the downlink control channel candidate index. In some cases, control signaling 215 includes a control channel element index, and where control signaling 215 indicates that the first search space set and the second search space set are linked based on the first search space set and the second search space set each being associated with the control channel element index.

In some examples, UE 115-a may monitor the first search space for a first instance of control information in the first downlink control channel and monitor the second search space for a second instance of the control information in the second downlink control channel. In some cases, UE 115-a may decode the first instance or the second instance of the control information, or both, based on the monitoring. In some cases, the first search space and the second search space include a same periodicity, a same number of monitoring occasions per slot, or a same number of candidates for each aggregation level, or any combination thereof. In some cases, the first downlink control channel and the second downlink control channel include a same downlink control channel candidate index, a same control channel element index (e.g., each search space starts from the same control channel element index), a same aggregation level, a same downlink control information payload, same downlink control information formats to monitor, same coded bits, or same search space type, or any combination thereof.

In some examples, UE 115-a may combine at least a portion of the first instance the control information with at least a portion of the second instance of the control information based on the monitoring. In some cases, UE 115-a may decode the first instance or the second instance of the control information based on the combining.

In some examples, UE 115-a may receive one or more multicast transmissions associated with the multicast broadcast service from base station 105-a while UE 115-a is operating in a connected mode. In some cases, UE 115-a may receive one or more signals in a common frequency resource that is configured within a dedicated unicast bandwidth part associated with the multicast broadcast service. In some cases, UE 115-a monitoring the first search space and the second search space may be based on UE 115-a receiving the one or more signals in the common frequency resource. In some cases, UE 115-a may receive the one or more signals in the one or more multicast transmissions associated with the multicast broadcast service.

In some cases, the common frequency resource may include the first search space, and the second search space. In some cases, the first downlink control channel may include a first group common physical downlink control channel associated with the group of UEs 220. In some cases, the second downlink control channel may include a second group common physical downlink control channel associated with the group of UEs 220. In some instances, the first search space may include a first common search space and the second search space may include a second common search space.

In some cases, the second search space may include a second common search space configured in a dedicated unicast bandwidth part. In some cases, the second downlink control channel of the second common search space may include a UE-specific physical downlink control channel.

In some cases, the second search space may include a UE-specific search space configured in the dedicated unicast bandwidth part. In some cases, the second downlink control channel of the UE-specific search space may include a UE-specific physical downlink control channel.

In some examples, a monitoring priority of the first common search space may be determined based on search space indexes of one or more type-X common search spaces or one or more UE-specific search spaces, or both. In some cases, the one or more type-X common search spaces may include the first common search space. In some cases, the one or more type-X common search spaces may include the first common search space and the second common search space. When a type-X common search space is used (e.g., for group-common PDCCH), the monitoring priority may be determined based on the search space set indexes of search space sets for multicast common search space sets and UE-specific search space sets.

In some examples, UE 115-a may receive one or more broadcast transmissions associated with the multicast broadcast service from base station 105-a while UE 115-a is operating in idle mode, inactive mode, or connected mode. In some cases, UE 115-a may receive one or more signals in a common frequency resource that is associated with the multicast broadcast service. In some cases, UE 115-a may receive the one or more signals in one or more broadcast transmissions associated with the multicast broadcast service. In some cases, the common frequency resource may include the first search space and the second search space. In some cases, the first downlink control channel may include a first group common physical downlink control channel associated with the group of UEs 220 and the second downlink control channel may include a second group common physical downlink control channel associated with the group of UEs 220.

In some examples, UE 115-a may receive one or more signals in a second common frequency resource that is configured within the dedicated unicast bandwidth part, where the second common frequency resource includes the second search space. In some cases, the second downlink control channel may include a second group common physical downlink control channel.

In some examples, the second search space may include a second common search space configured in the dedicated unicast bandwidth part, and the second downlink control channel may include a UE-specific physical downlink control channel.

In some examples, the second search space may include a UE-specific search space configured in the dedicated unicast bandwidth part, and the second downlink control channel may include a UE-specific physical downlink control channel.

In some examples, the common frequency resource is broadcasted in a system information block to enable the UE to detect a multicast broadcast control channel, or the common frequency resource is broadcasted in the multicast broadcast control channel to enable the UE to detect a multicast broadcast traffic channel.

In some examples, UE 115-a may receive control information in repetitive PDCCH transmissions (e.g., within indicated search space sets). In some cases, UE 115-a may determine that the repetitive PDCCH transmissions schedule a channel (e.g., physical downlink shared channel (PDSCH), physical uplink shared channel (PUSCH), physical sidelink shared channel (PSSCH)) for reception or transmission by UE 115-a. In some cases, UE 115-a may identify resources (e.g., time resources, frequency resources, or both) for the channel scheduled by the repetitive PDCCH transmissions. In some cases, UE 115-a may communicate the channel based on the identified resources and based on the received control information in the repetitive PDCCH transmissions. In some cases, the repetitive PDCCH transmissions may contain the same control information that indicates a resource allocation for the channel (e.g., PDSCH, PUSCH, PSSCH). In some cases, UE 115-a may soft-combine the repetitive PDCCH transmissions to decode the control information.

In some examples, UE 115-*a* may receive each of multiple PDSCHs in respective time intervals, soft-combine the PDSCHs based on the control information, and decode data within the PDSCHs based on the soft-combination of the PDSCHs. In some cases, UE 115—may transmit an indication, after at least one of the time intervals, of whether at least one of the control information or data within the preceding time interval was successfully decoded.

The present techniques may reduce power consumption and free up processing cycles of one or more devices (e.g., battery-operated devices, a UE 115 of FIG. 1, etc.) by increasing control channel reliability of wireless systems that support multicast broadcast services, thus improving user experience of the one or more devices with longer battery life and improved quality of service.

Figure 3:
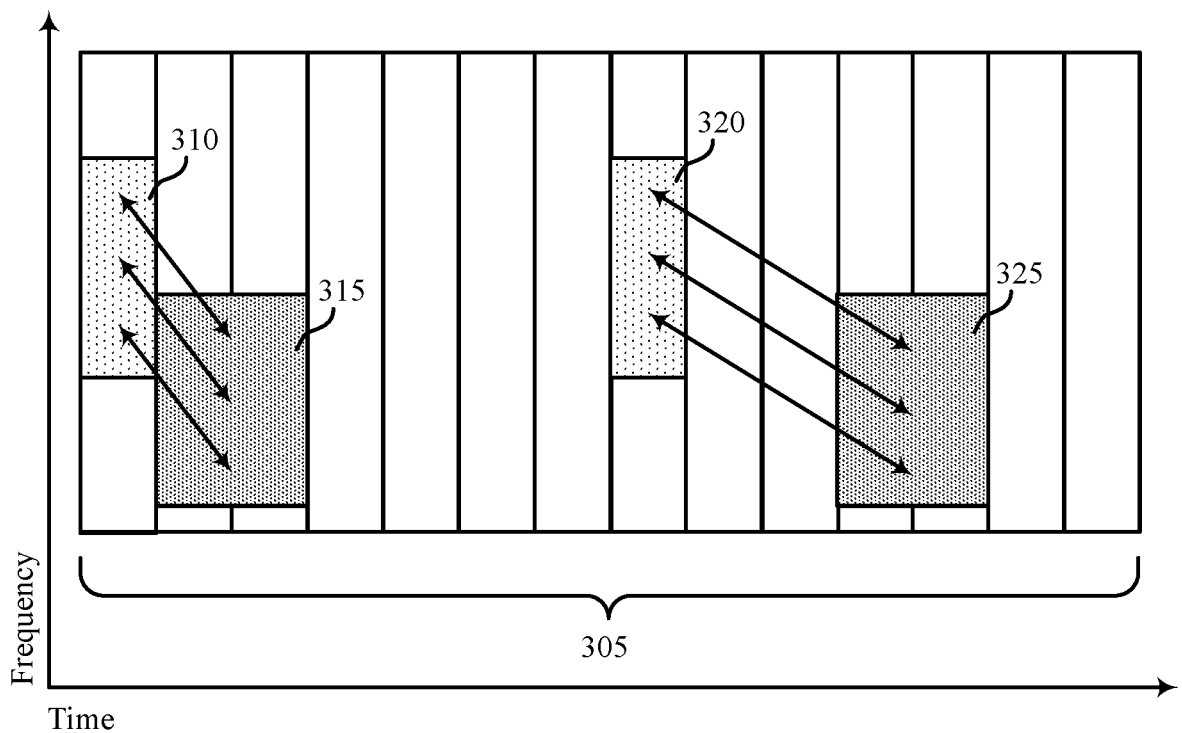
FIG. 3 illustrates an example of an environment that supports multicast broadcast services control channel reliability in accordance with aspects of the present disclosure.
Figure 3:
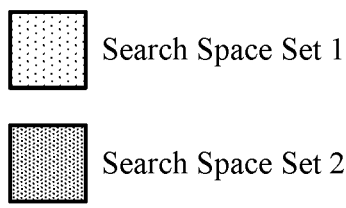

FIG. 3 illustrates an example of an environment 300 that supports multicast broadcast services control channel reliability in accordance with aspects of the present disclosure.

In the illustrated example, environment 300 may include slot 305. In some examples, slot 305 may include a 14-symbol slot. As shown, slot 305 may include first search space set 310, second search space set 315, first search space set 320, and second search space set 325.

For an RRC connected UE (e.g., UE 115-*a*, one or more UEs of the group of UEs 220), repetitive PDCCH transmissions may be supported in different search space sets associated with corresponding CORESETs. In some cases, different transmission configuration indicator (TCI) states may be associated with repetitive PDCCH transmissions (e.g., a base station may use different transmit beams for the respective repetitive PDCCH transmissions). In some cases, In the illustrated example, first search space set 310 may be linked to second search space set 315. In some cases, control signaling (e.g., one or more control messages) may indicate an explicit link between first search space set 310 and second search space set 315. In some examples, first search space set 310 may include a first downlink control channel (e.g., a first PDCCH candidate) and second search space set 315 may include a second downlink control channel (e.g., a second PDCCH candidate). Accordingly, the first downlink control channel of first search space set 310 may be linked to the second downlink control channel of second search space set 315. In some cases, a one-to-one mapping may exist between the first downlink control channel of first search space set 310 and the second downlink control channel of second search space set 315.

In the illustrated example, first search space set 320 may be linked to second search space set 325. In some cases, control signaling (e.g., one or more control messages) may indicate an explicit link between first search space set 320 and second search space set 325. In some examples, first search space set 320 may include a first downlink control channel (e.g., a first PDCCH candidate) and second search space set 325 may include a second downlink control channel (e.g., a second PDCCH candidate). Accordingly, the first downlink control channel of first search space set 320 may be linked to the second downlink control channel of second search space set 325. In some cases, a one-to-one mapping may exist between the first downlink control channel of first search space set 320 and the second downlink control channel of second search space set 325.

In some examples, two linked search space sets (e.g., first search space set 310 linked to second search space set 315, first search space set 320 linked to second search space set 325) may have the same periodicity, the same number of monitoring occasions (MOs) per slot, or the same number of PDCCH candidates for a given aggregation level, or any combination thereof. In some cases, a first PDCCH candidate of first search space set 310 may be transmitted in a first transmission time interval, while a second PDCCH candidate of second search space set 315 may be transmitted in a second transmission time interval different from the first transmission time interval. In some cases, a first PDCCH candidate of first search space set 320 may be transmitted at a first time, while a second PDCCH candidate of second search space set 325 may be transmitted at a second time different from the first time. In some cases, a first PDCCH candidate of first search space set 310 may have the same index, the same aggregation level, the same downlink control information payload, the same coded bits, the same search space set type, or the same downlink control information formats to monitor, or any combination thereof, as a second PDCCH candidate of second search space set 315. Although an example of intra-slot PDCCH repetition (e.g., PDCCH repetition in the same slot) is shown, in some cases, PDCCH repetition described herein may include inter-slot PDCCH repetition (e.g., PDCCH repetition between two different slots).

In some examples, a UE (e.g., UE 115-*a*, one or more UEs of the group of UEs 220) may monitor a first search space set (e.g., first search space set 310, first search space set 320) and a corresponding second search space set (e.g., second search space set 315 linked to first search space set 310, second search space set 325 linked to first search space set 320). In some cases, the monitoring may be based on the UE identifying the link between the first search space set and the second search space set. In some cases, the UE may identify the link between a first search space set and a second search space set based on a downlink control channel candidate index associated with the first search space set and a downlink control channel candidate index associated with the second search space set (e.g., based on a match between the respective indexes). In some cases, the UE may identify the link between the first search space set and the second search space set based on a control channel element index associated with the first search space set and a control channel element index associated with the second search space set (e.g., based on a match between the respective indexes). In some cases, a UE group configuration included in the control signaling indicates that the first search space set and the second search space set are linked.

In some examples, the UE may receive one or more signals over a downlink shared channel using parameters associated with the multicast broadcast service that are based on the link between the first search space set and the second search space set. In some cases, the first downlink control channel (e.g., first PDCCH candidate) may include a group common PDCCH (GC-PDCCH) and the second downlink control channel (e.g., second PDCCH candidate) may include a GC-PDCCH. In some cases, the control signaling indicates that parameters for a downlink shared channel are scheduled by the first downlink control channel when the first downlink control channel includes a GC-PDCCH and the second downlink control channel includes a UE-specific PDCCH. When the UE-specific PDCCH is linked with a GC-PDCCH for PDCCH repetition, the parameters for PDSCH scheduled by the GC-PDCCH candidate and UE-specific PDCCH candidate may be based on the PDSCH configuration for multicast broadcast service configured in a common frequency resource, instead of a PDSCH configuration for unicast configured in a dedicated bandwidth part. In some cases, a scrambling of the downlink shared channel may be based on a reference scrambling. In some cases, the reference scrambling may include a group radio network temporary identifier (G-RNTI) associated with the GC-PDCCH. In some cases, scrambling of PDSCH that is scheduled by GC-PDCCH and UE-specific PDCCH may be based on the reference scrambling (e.g., G-RNTI for GC-PDCCH).

For GC-PDCCH repetition, the reference PDCCH candidate may be common for a given UE group (e.g., UEs in the same MBS group). When the same GC-PDCCH repetition scheme using a first GC-PDCCH candidate linked to a second GC-PDCCH candidate is configured for all the UEs in the same MBS group, the reference GC-PDCCH candidate may differ similar to unicast PDCCH repetition (e.g., the reference GC-PDCCH candidate may have one or more attributes that are different from the attributes of the GC-PDCCH candidate linked to the reference GC-PDCCH candidate). Otherwise, the reference GC-PDCCH candidate may be configured or indicated as the GC-PDCCH candidate common among the UEs (e.g., when the first candidate is GC-PDCCH and the second is UE-specific PDCCH). In some cases, some UEs in the group of UEs (e.g., a legacy UE not supporting GC-PDCCH repetition) may receive one of the PDCCH candidates (e.g., the GC-PDCCH candidate) with PDCCH repetition. In some cases, some UEs in the group of UEs (e.g., a UE supporting GC-PDCCH repetition) may receive the first PDCCH candidate (e.g., GC-PDCCH) and the second PDCCH candidate (e.g., second GC-PDCCH candidate or a UE-specific PDCCH candidate).

In some examples, two linked PDCCH candidates may use two or three blind detections based on UE capability. In some cases, a UE may perform a first blind detection in the first search space set (e.g., first search space set 310, first search space set 320) to find the first downlink control channel (e.g., first PDCCH candidate), and then perform a second blind detection in the corresponding second search space set (e.g., second search space set 315 linked to first search space set 310, second search space set 325 linked to first search space set 320) to find the second downlink control channel (e.g., second PDCCH candidate). In some cases, the UE may determine a common attribute (e.g., a same downlink control channel candidate index, a same control channel element index, a same aggregation level, a same downlink control information payload, same downlink control information formats to monitor, same coded bits, or same search space type, or any combination thereof). In some cases, the link between the PDCCH candidates may be based on a fixed rule (e.g., a rule indicated by control signaling). In some cases (e.g., PDCCH candidates are linked by the fixed rule), the UE may search the first search space set to identify the first PDCCH candidate, and then referring to one or more attributes of the first PDCCH candidate, identify matching attributes in the second PDCCH candidate to find the second PDCCH candidate.

In some examples, (e.g., downlink assignment index (DAI), PUCCH resource indication (PRI) in the PDCCH, timeline, out of order (OoO), PDCCH scheduling, etc.), a reference PDCCH candidate (e.g., among two linked PDCCH candidates) may be defined (e.g., via control signaling) to avoid ambiguity. In some cases, a reference PDCCH candidate may have one or more attributes that are different from the attributes of the PDCCH candidate linked to the reference PDCCH candidate.

Figure 4:
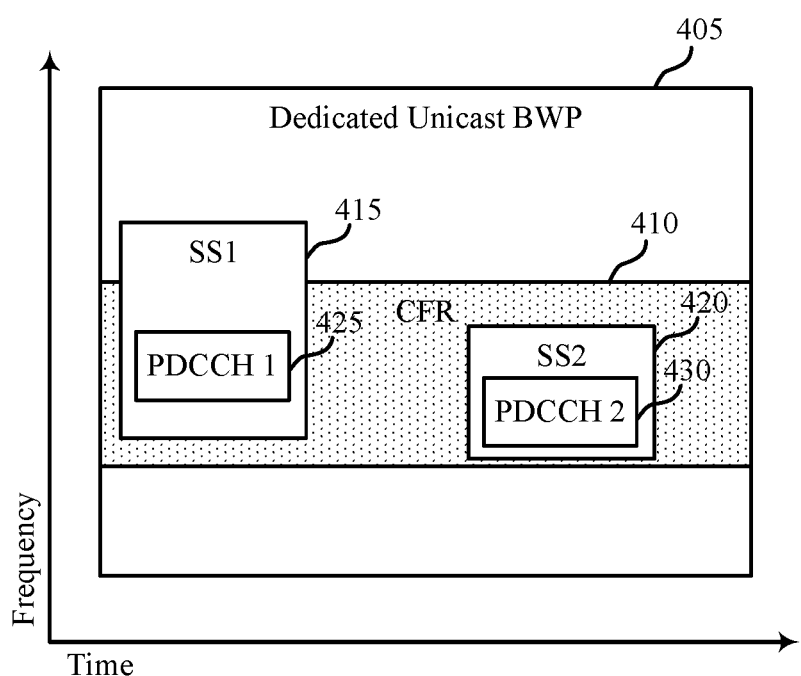
FIG. 4 illustrates an example of an environment that supports multicast broadcast services control channel reliability in accordance with aspects of the present disclosure.

FIG. 4 illustrates an example of an environment 400 that supports multicast broadcast services control channel reliability in accordance with aspects of the present disclosure.

In the illustrated example, environment 400 may include bandwidth part (BWP) 405. In some cases, BWP 405 may include a dedicated unicast bandwidth part. As shown, common frequency resource (CFR) 410 may be confined within the BWP 405 using a same numerology (e.g., subcarrier spacing and cyclic shift configuration). In some examples, CFR 410 may include first search space set 415 and second search space set 420. In some cases, first search space set 415 may include a first common search space, and second search space set 420 may include a second common search space. As shown, first search space set 415 may be associated with a first CORESET and include first PDCCH candidate 425 within a frequency region of the first CORESET and second search space set 420 may be associated with a second CORESET and include second PDCCH candidate 430 within a frequency region of the second CORESET.

In some examples, a UE (e.g., UE 115-a, one or more UEs of the group of UEs 220) may receive from a base station (e.g., base station 105-a) one or more multicast transmissions associated with the multicast broadcast service while the UE is operating in a connected mode. In some examples, the UE may receive, for a multicast transmission of the base station, one or more signals in CFR 410 configured via unicast RRC signaling, as shown, within the frequency region of the BWP 405.

In some examples, first PDCCH candidate 425 may include a first group common PDCCH (GC-PDCCH) in first search space set 415, and second PDCCH candidate 430 may include a second GC-PDCCH in second search space set 420. In some cases, first search space set 415 or second search space set 420, or both, may be configured in CFR 410 that is used for a GC-PDCCH (e.g., first PDCCH candidate 425 or second search space set 420). In some cases, first search space set 415 and second search space set 420 may be type-x search spaces (e.g., type-x common search spaces configured for MBS GC-PDCCH), respectively. In some cases, a base station (e.g., base station 105-a) may transmit control signaling message (e.g., RRC message) that explicitly links the first PDCCH candidate 425 with the second PDCCH candidate 430.

In some examples, a UE (e.g., UE 115-a, one or more UEs of the group of UEs 220) may receive from a base station (e.g., base station 105-a) one or more broadcast transmissions associated with the multicast broadcast service while the UE is operating in idle mode, inactive mode, or connected mode. In some cases, the UE may receive, for a broadcast transmission of the base station, one or more signals in CFR 410 configured via broadcast RRC signaling. The CFR may have a frequency size that is the same, smaller or larger than that of an initial BWP. A UE in connected mode may be configured with the BWP 405, and the CFR 410 for broadcast transmission may be, as shown, within the frequency region of the BWP 405. In some cases, CFR 410 may be broadcasted in a system information block to enable the UE to detect a multicast broadcast control channel. In some cases, CFR 410 may be broadcasted in a multicast broadcast control channel to enable the UE to detect a multicast broadcast traffic channel.

Figure 5:
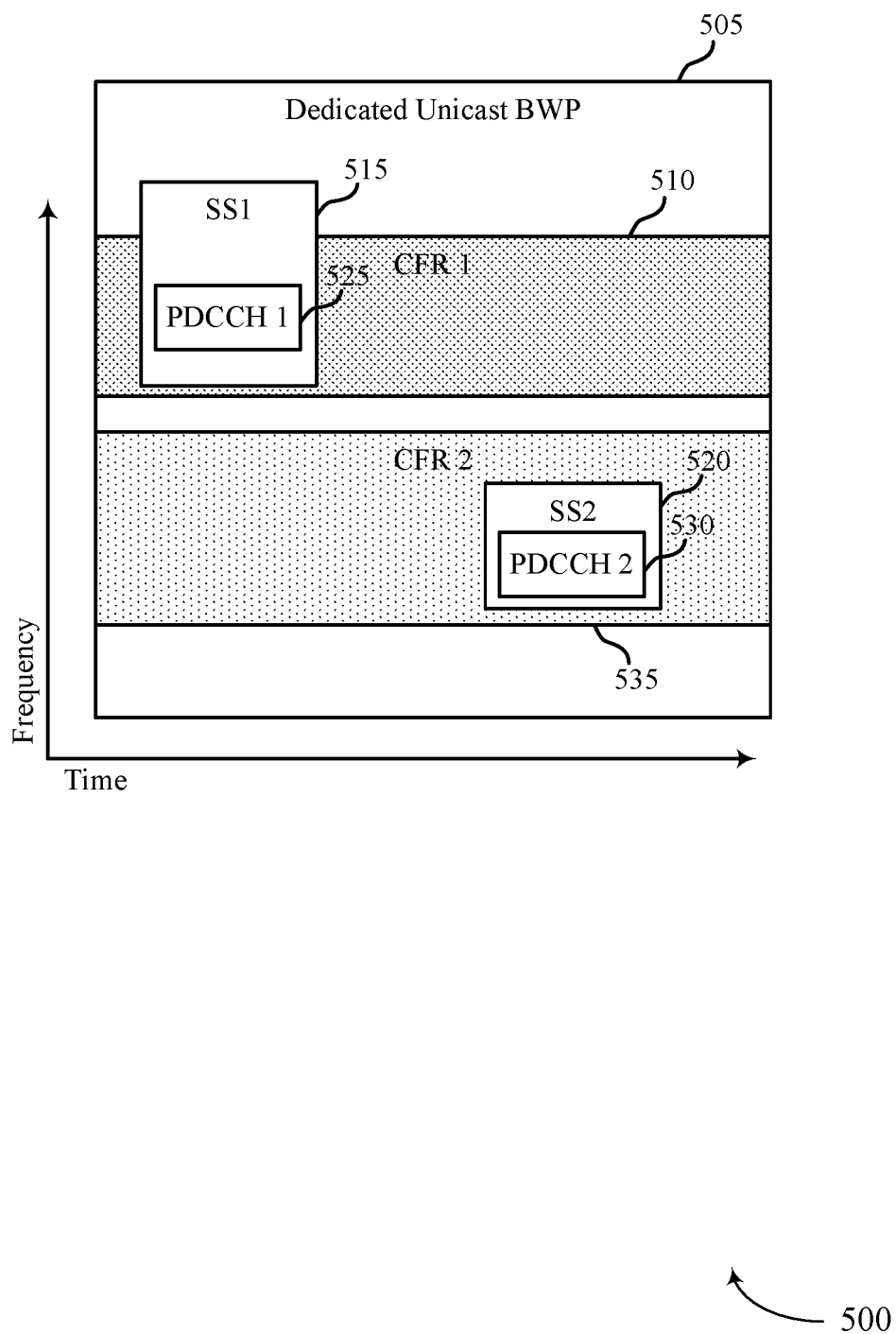
FIG. 5 illustrates an example of an environment that supports multicast broadcast services control channel reliability in accordance with aspects of the present disclosure.

FIG. 5 illustrates an example of an environment 500 that supports multicast broadcast services control channel reliability in accordance with aspects of the present disclosure.

In the illustrated example, environment 500 may include bandwidth part (BWP) 505. In some cases, BWP 505 may include a dedicated unicast bandwidth part. As shown, first common frequency resource (CFR) 510 and second CFR 535 are confined within the frequency region of BWP 505 using the same numerology. In some examples, the first CFR 510 may be configured via broadcast RRC signaling for broadcast transmission associated with the multicast broadcast service, and the second CFR 535 may be configured via unicast RRC signaling for multicast transmission associated with the multicast broadcast service. In some examples, first CFR 510 may include first search space set 515. As shown, second CFR 535 may include second search space set 520. In some cases, first search space set 515 may include a first common search space, and second search space set 520 may include a second common search space. As shown, first search space set 515 in first CFR 510 may include first PDCCH candidate 525, and second search space set 520 in second CFR 535 may include second PDCCH candidate 530.

In some examples, a first set of UEs (e.g., a first set of one or more UEs of the group of UEs 220) may receive from a base station (e.g., base station 105-*a*) one or more broadcast transmissions associated with the multicast broadcast service while each UE of the first set of UEs is operating in idle mode, inactive mode, or connected mode (e.g., a first UE of the first set of UEs operating in idle mode, a second UE of the first set of UEs operating in inactive mode, a third UE of the first set of UEs operating in connected mode, etc.). In some examples, first search space set 515 may be configured for the first set of UEs. In some cases, the first set of UEs are associated with (e.g., receive and decode) the first PDCCH candidate 525 of the first CFR 510.

In some cases, the first set of UEs may receive, in a broadcast transmission of the base station, one or more signals in first CFR 510 configured, as shown, within BWP 505. In some cases, first PDCCH candidate 525 may include a first GC-PDCCH. In some cases, first CFR 510 may be broadcasted in a system information block to enable the first set of UEs to detect a multicast broadcast control channel. In some cases, first CFR 510 may be broadcasted in a multicast broadcast control channel to enable the first set of UEs to detect a multicast broadcast traffic channel.

In some examples, a second set of UEs (e.g., a second set of one or more UEs of the group of UEs 220) different from the first set of UEs may receive from the base station one or more transmissions associated with the multicast broadcast service while the second set of UEs are operating in connected mode. In some examples, second search space set 520 may be configured for the second set of UEs. In some cases, the second set of UEs are associated with (e.g., receive and decode) the second PDCCH candidate 530 of the second CFR 535.

In some examples, the second set of UEs may receive, in a transmission of the base station, one or more signals in second CFR 535 configured, as shown, within BWP 505. In some cases, second PDCCH candidate 530 may include a second GC-PDCCH.

Figure 6:
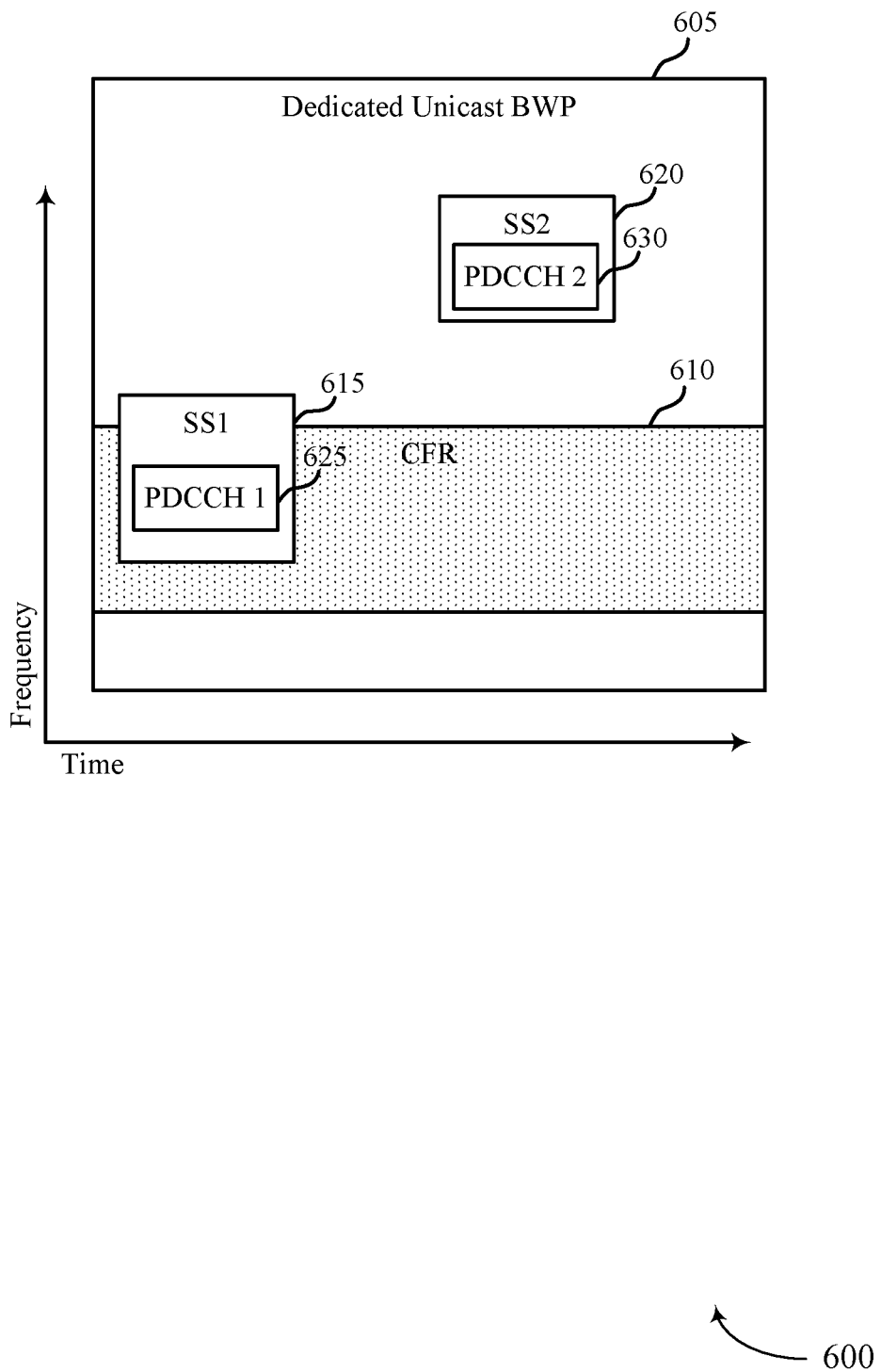
FIG. 6 illustrates an example of an environment that supports multicast broadcast services control channel reliability in accordance with aspects of the present disclosure.

FIG. 6 illustrates an example of an environment 600 that supports multicast broadcast services control channel reliability in accordance with aspects of the present disclosure.

In the illustrated example, environment 600 may include bandwidth part (BWP) 605. In some cases, BWP 605 may include a dedicated unicast bandwidth part. As shown, common frequency resource (CFR) 610 may be confined within BWP 605 using the same numerology. In some examples, CFR 610 may include first search space set 615, while BWP 605 may include second search space set 620. Accordingly, first search space set 615 may be configured in CFR 610 associated with BWP 605, while second search space set 620 may be configured in BWP 605 (e.g., not within CFR 610). In some cases, first search space set 615 may include a first common search space. In some cases, second search space set 620 may include a second common search space or a UE-specific search space. As shown, first search space set 615 may include first PDCCH candidate 625 and second search space set 620 may include second PDCCH candidate 630.

In some examples, a UE (e.g., UE 115-*a*, one or more UEs of the group of UEs 220) may receive from a base station (e.g., base station 105-*a*) one or more multicast transmissions associated with the multicast broadcast service while the UE is operating in a connected mode.

In some examples, first PDCCH candidate 625 may include a GC-PDCCH in first search space set 615, where first search space set 615 may include a type-X common search space. The type-X common search space may be a common search space with configurable monitoring priority configured for group common PDCCH associated with multicast broadcast transmission. In some cases, one or more UEs may determine this configuration (e.g., configurable monitoring priority) based on an associated search space set index. In some cases, second PDCCH candidate 630 may include a UE-specific PDCCH in second search space set 620, where second search space set 620 is a legacy common search space (e.g., type0, type0a, type1, type2, or type3 CSS). In some cases, first PDCCH candidate 625 and second PDCCH candidate 630 have the same DCI format (e.g., DCI format 1_0). In some cases, first PDCCH candidate 625 and second PDCCH candidate 630 may have one or more different fields, which may inhibit one or more UEs from soft-combining the first PDCCH candidate 625 and the second PDCCH candidate 630. In some cases, polar coded bits (e.g., with one or more frozen bits) in first PDCCH candidate 625 and second PDCCH candidate 630 may enable one or more UEs to perform soft-combining on first PDCCH candidate 625 and second PDCCH candidate 630 (e.g., even if first PDCCH candidate 625 and second PDCCH candidate 630 have different cyclic redundancy check (CRC) scrambling).

In some examples, first PDCCH candidate 625 may include a GC-PDCCH in first search space set 615, where first search space set 615 may include a type-X common search space. In some cases, second PDCCH candidate 630 may include a UE-specific PDCCH in second search space set 620, where second search space set 620 is a UE-specific search space. In some cases, one or more UEs may determine this configuration based on an associated search space set index. As shown, first search space set 615 configured as a type-X common search space may be configured in CFR 610, while second search space set 620 configured as a UE-specific search space may be configured in BWP 605. In some cases, one or more UEs of a group of UEs may monitor the first PDCCH candidate 625 (e.g., GC-PDCCH) and use an associated G-RNTI in first search space set 615. A UE may monitor the second PDCCH candidate 630 (e.g., UE-specific PDCCH) and use an associated UE-specific RNTI in second search space set 620. In some cases, first PDCCH candidate 625 (e.g., GC-PDCCH candidate with G-RNTI) and second PDCCH candidate 630 (e.g., PDCCH candidate with cell RNTI (C-RNTI)) may have same the DCI format (e.g., DCI format 1_1, DCI format 1_2). In some cases, first PDCCH candidate 625 and second PDCCH candidate 630 may have one or more different fields, which may inhibit one or more UEs from soft-combining the first PDCCH candidate 625 and the second PDCCH candidate 630, which may be remedied based on polar coded bits (e.g., with one or more frozen bits).

In some examples, a UE (e.g., UE 115-*a*, one or more UEs of the group of UEs 220) may receive from a base station (e.g., base station 105-*a*) one or more broadcast transmissions associated with the multicast broadcast service while the UE is operating in connected mode. In some cases, the UE may receive, in a broadcast transmission of the base station, one or more signals in CFR 610 configured, as shown, within BWP 605. In some cases, first PDCCH candidate 625 may include a first GC-PDCCH. In some cases, CFR 610 may be broadcasted in a system information block to enable one or more UEs to detect a multicast broadcast control channel. In some cases, CFR 610 may be broadcasted in a multicast broadcast control channel to enable the UE to detect a multicast broadcast traffic channel. In some cases, second search space set 620 may be configured in BWP 605 to enable one or more connected UEs to receive second PDCCH candidate 630.

In some examples, first PDCCH candidate 625 may include a GC-PDCCH in first search space set 615, where CFR 610 is broadcasted by a base station, where first search space set 615 may include a type-X common search space. In some cases, second PDCCH candidate 630 may include a UE-specific PDCCH in second search space set 620, where second search space set 620 is a legacy common search space. In some cases, second PDCCH candidate 630 may include a UE-specific PDCCH in second search space set 620, where second search space set 620 is a UE-specific search space.

Figure 7:
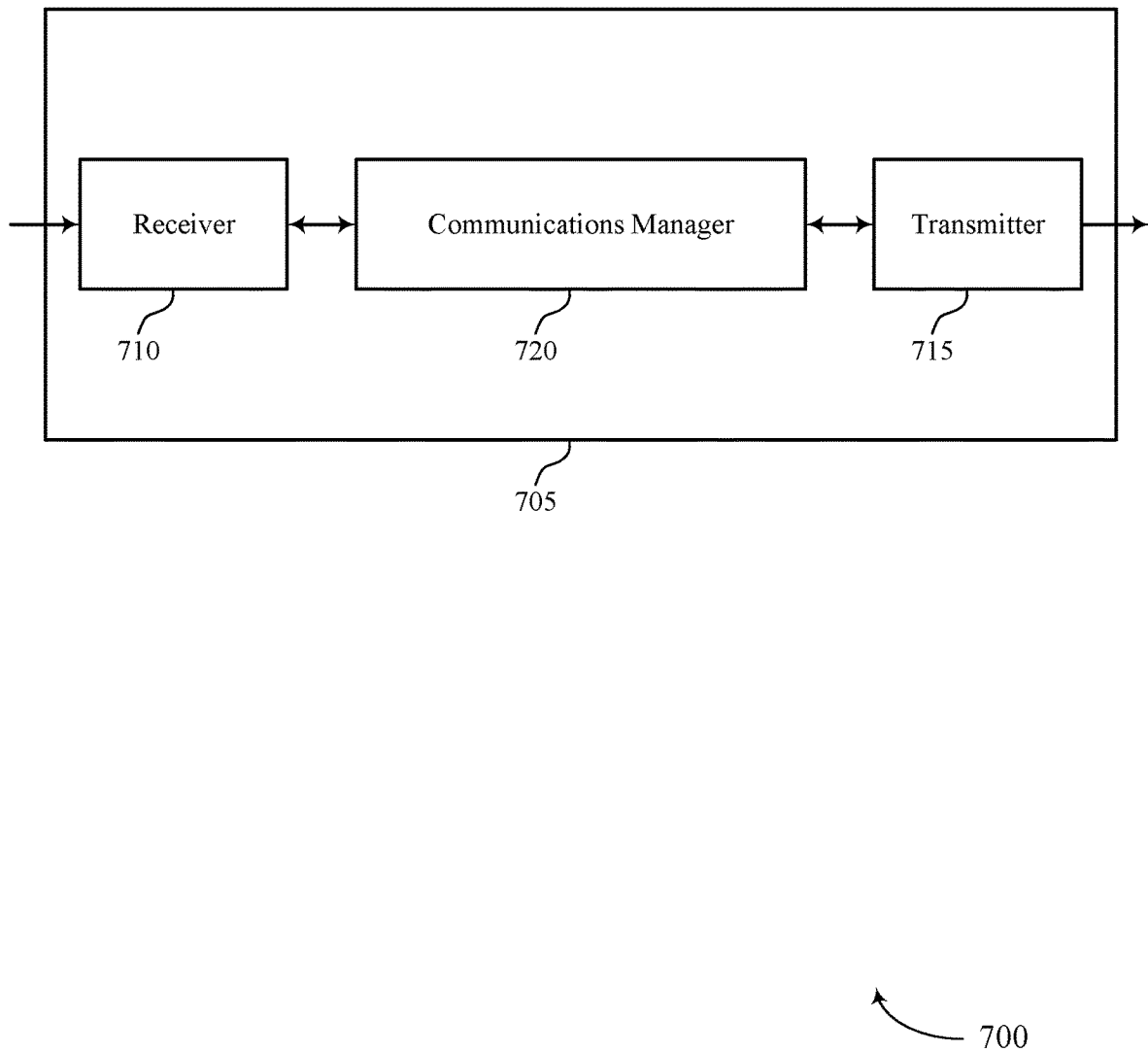
FIGS. 7 and 8 show block diagrams of devices that support multicast broadcast services control channel reliability in accordance with aspects of the present disclosure.

FIG. 7 shows a block diagram 700 of a device 705 that supports multicast broadcast services control channel reliability in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multicast broadcast services control channel reliability). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multicast broadcast services control channel reliability). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of multicast broadcast services control channel reliability as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, from a base station and at the UE of a group of UEs, control signaling indicating a link between a first search space and a second search space used for a multicast broadcast service, where a first downlink control channel for the group of UEs is transmitted in the first search space and a second downlink control channel is transmitted in the second search space. The communications manager 720 may be configured as or otherwise support a means for monitoring the first search space for a first instance of control information in the first downlink control channel and the second search space for a second instance of the control information in the second downlink control channel. The communications manager 720 may be configured as or otherwise support a means for decoding the first instance or the second instance of the control information, or both, based on the monitoring.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for increasing the efficiency and reliability of repetitive PDCCH transmissions for a group of UEs. The reliability of MBS GC-PDCCH transmissions is increased by the present techniques that may include PDCCH transmissions in MBS GC-PDCCH transmissions for a group of UEs (e.g., UEs in the same MBS group). Also, described techniques may result in reduced processing, reduced power consumption, more efficient utilization of communication resources.

Figure 8:
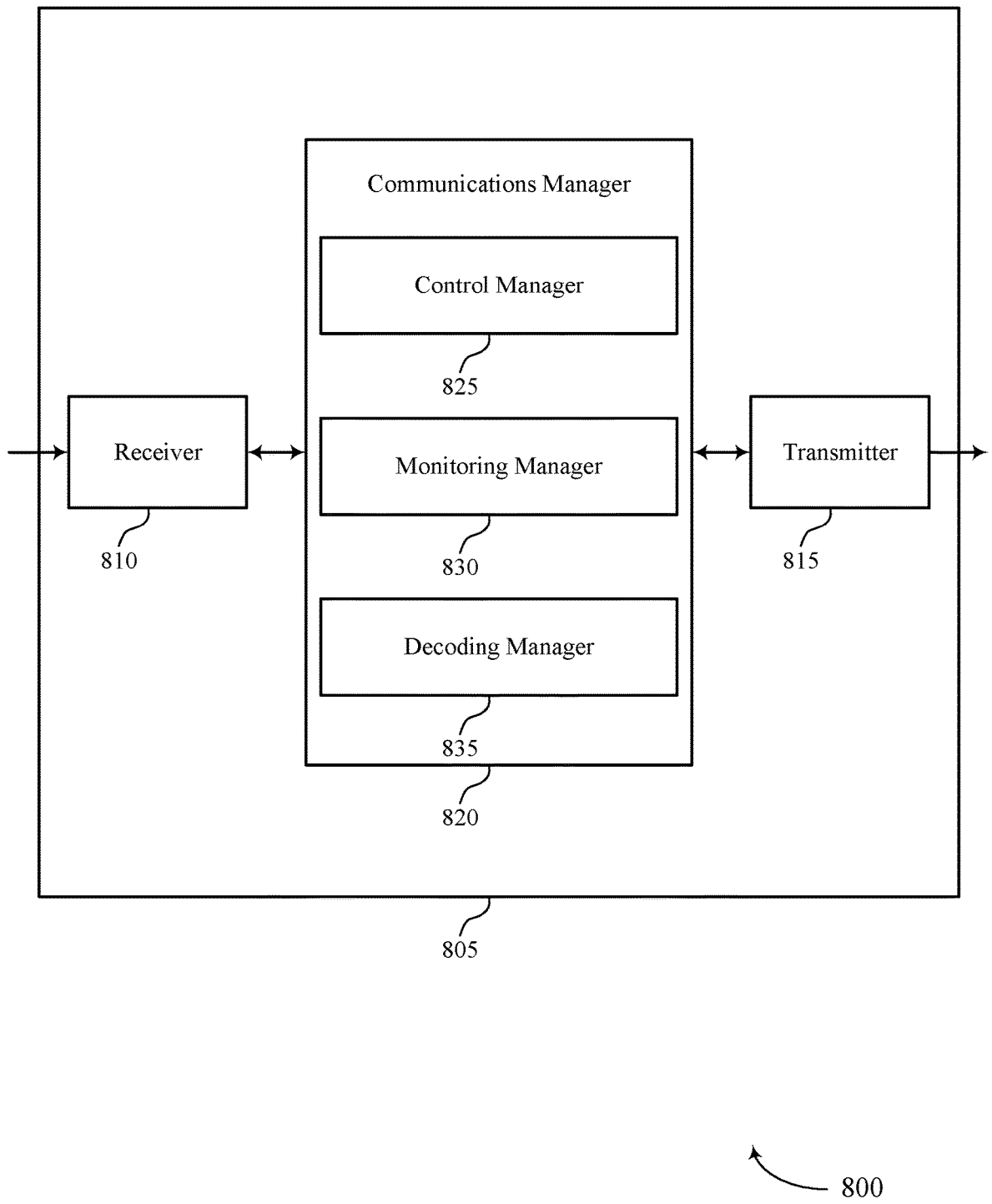

FIG. 8 shows a block diagram 800 of a device 805 that supports multicast broadcast services control channel reliability in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multicast broadcast services control channel reliability). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multicast broadcast services control channel reliability). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of multicast broadcast services control channel reliability as described herein. For example, the communications manager 820 may include a control manager 825, a monitoring manager 830, a decoding manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The control manager 825 may be configured as or otherwise support a means for receiving, from a base station and at the UE of a group of UEs, control signaling indicating a link between a first search space and a second search space used for a multicast broadcast service, where a first downlink control channel for the group of UEs is transmitted in the first search space and a second downlink control channel is transmitted in the second search space. The monitoring manager 830 may be configured as or otherwise support a means for monitoring the first search space for a first instance of control information in the first downlink control channel and the second search space for a second instance of the control information in the second downlink control channel. The decoding manager 835 may be configured as or otherwise support a means for decoding the first instance or the second instance of the control information, or both, based on the monitoring.

Figure 9:
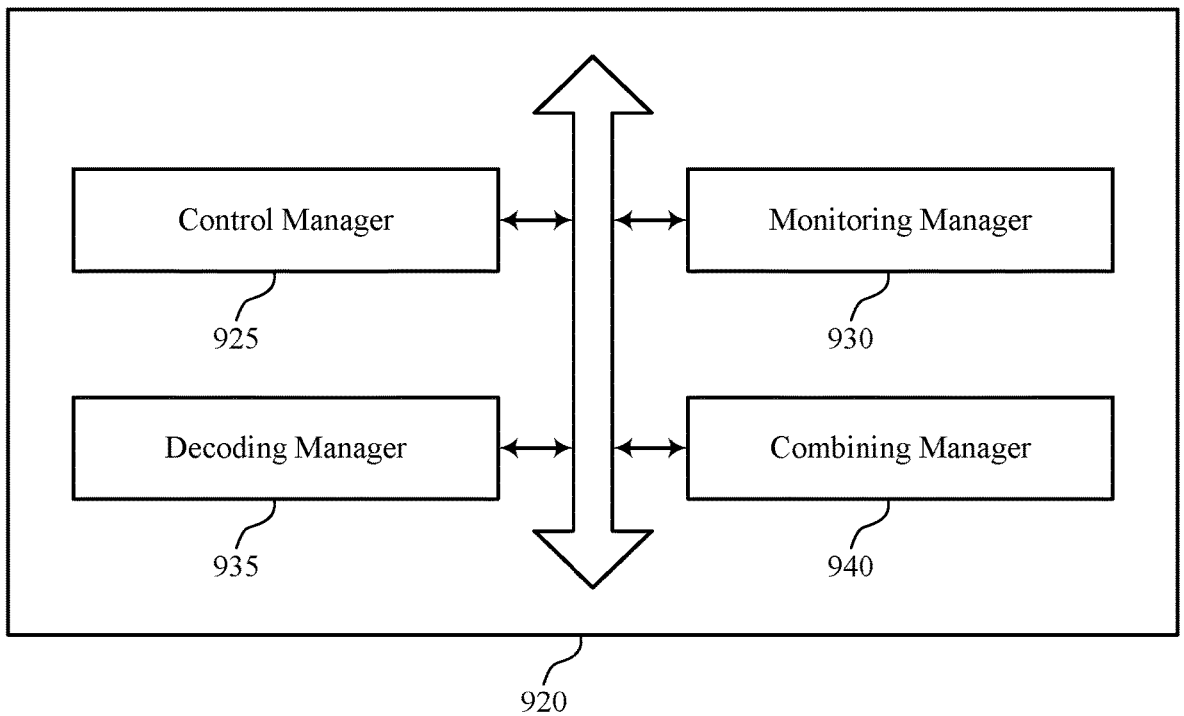
FIG. 9 shows a block diagram of a communications manager that supports multicast broadcast services control channel reliability in accordance with aspects of the present disclosure.

FIG. 9 shows a block diagram 900 of a communications manager 920 that supports multicast broadcast services control channel reliability in accordance with aspects of the present disclosure. The communications manager 920 may be an example of aspects of a communications manager 720, a communications manager 820, or both, as described herein. The communications manager 920, or various components thereof, may be an example of means for performing various aspects of multicast broadcast services control channel reliability as described herein. For example, the communications manager 920 may include a control manager 925, a monitoring manager 930, a decoding manager 935, a combining manager 940, or any combination thereof. Each of these components may communicate, directly or indirectly, with one another (e.g., via one or more buses).

The communications manager 920 may support wireless communication at a UE in accordance with examples as disclosed herein. The control manager 925 may be configured as or otherwise support a means for receiving, from a base station and at the UE of a group of UEs, control signaling indicating a link between a first search space and a second search space used for a multicast broadcast service, where a first downlink control channel for the group of UEs is transmitted in the first search space and a second downlink control channel is transmitted in the second search space. The monitoring manager 930 may be configured as or otherwise support a means for monitoring the first search space for a first instance of control information in the first downlink control channel and the second search space for a second instance of the control information in the second downlink control channel. The decoding manager 935 may be configured as or otherwise support a means for decoding the first instance or the second instance of the control information, or both, based on the monitoring.

In some examples, the combining manager 940 may be configured as or otherwise support a means for combining at least a portion of the first instance the control information with at least a portion of the second instance of the control information based on the monitoring, where decoding the first instance or the second instance of the control information is based on the combining.

In some examples, the monitoring manager 930 may be configured as or otherwise support a means for receiving one or more signals in a common frequency resource that is configured within a dedicated unicast bandwidth part associated with the multicast broadcast service, where monitoring the first search space and the second search space is based on receiving the one or more signals in the common frequency resource.

In some examples, the common frequency resource includes the first search space, the first search space includes a first common search space, and the first downlink control channel includes a first group common physical downlink control channel associated with the group of UEs.

In some examples, the common frequency resource includes the second search space, the second search space includes a second common search space, and the second downlink control channel includes a second group common physical downlink control channel associated with the group of UEs.

In some examples, the second search space includes a second common search space configured in the dedicated unicast bandwidth part, and the second downlink control channel includes a UE-specific physical downlink control channel.

In some examples, the second search space includes a UE-specific search space configured in the dedicated unicast bandwidth part, and the second downlink control channel includes a UE-specific physical downlink control channel.

In some examples, a monitoring priority of the first common search space is determined based on search space indexes of one or more type-X common search spaces or one or more UE-specific search spaces, or both, the one or more type-X common search spaces including at least the first common search space.

In some examples, the monitoring manager 930 may be configured as or otherwise support a means for receiving one or more signals in a common frequency resource that is associated with the multicast broadcast service, the common frequency resource including the first search space, where the first downlink control channel includes a first group common physical downlink control channel.

In some examples, the common frequency resource includes the second search space, and the second downlink control channel includes a second group common physical downlink control channel associated with the group of UEs.

In some examples, the monitoring manager 930 may be configured as or otherwise support a means for receiving one or more signals in a second common frequency resource that is configured within the dedicated unicast bandwidth part, the second common frequency resource including the second search space, where the second downlink control channel includes a second group common physical downlink control channel.

In some examples, the second search space includes a second common search space configured in the dedicated unicast bandwidth part, and the second downlink control channel includes a UE-specific physical downlink control channel.

In some examples, the second search space includes a UE-specific search space configured in the dedicated unicast bandwidth part, and the second downlink control channel includes a UE-specific physical downlink control channel.

In some examples, the common frequency resource is broadcasted in a system information block to enable the UE to detect a multicast broadcast control channel, or the common frequency resource is broadcasted in the multicast broadcast control channel to enable the UE to detect a multicast broadcast traffic channel.

In some examples, the monitoring manager 930 may be configured as or otherwise support a means for identifying the link between the first search space and the second search space based on downlink control channel candidate indexes for the first search space and the second search space, where monitoring the first search space and the second search space is based on identifying the link.

In some examples, the monitoring manager 930 may be configured as or otherwise support a means for identifying the link between the first search space and the second search space based on control channel element indexes for the first search space and the second search space, where monitoring the first search space and the second search space is based on identifying the link.

In some examples, a UE group configuration included in the control signaling indicates that the first search space and the second search space are linked.

In some examples, the monitoring manager 930 may be configured as or otherwise support a means for receiving one or more signals over a downlink shared channel using parameters associated with the multicast broadcast service based on the link between the first search space and the second search space and the first downlink control channel including a group common physical downlink control channel and the second downlink control channel including a UE-specific physical downlink control channel.

In some examples, a scrambling of the downlink shared channel is based on a reference scrambling. In some examples, the reference scrambling includes a group radio network temporary identifier associated with the group common physical downlink control channel.

In some examples, the second downlink control channel includes a same downlink control information format as the first downlink control channel.

In some examples, the group of UEs includes a multicast broadcast services group of UEs, and each UE of the group of UEs are configured for control signaling repetition.

In some examples, the control signaling includes radio resource control, or downlink control information, or media access control-control element, or a combination thereof.

In some examples, the first search space and the second search space include a same periodicity, a same number of monitoring occasions per slot, or a same number of candidates for each aggregation level, or any combination thereof.

In some examples, the first downlink control channel and the second downlink control channel include a same downlink control channel candidate index, a same control channel element index, a same aggregation level, a same downlink control information payload, same downlink control information formats to monitor, same coded bits, or same search space type, or any combination thereof.

Figure 10:
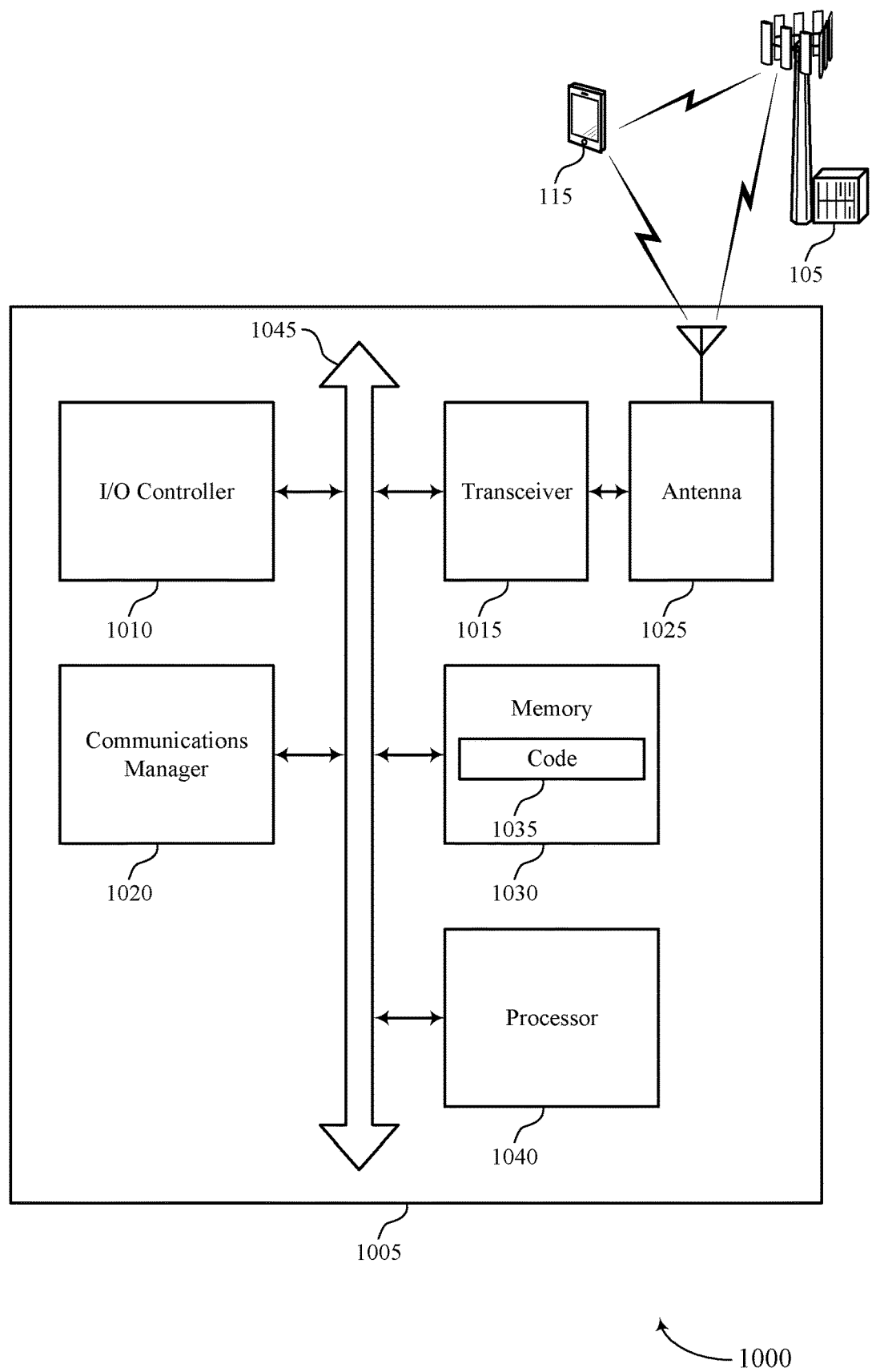
FIG. 10 shows a diagram of a system including a device that supports multicast broadcast services control channel reliability in accordance with aspects of the present disclosure.

FIG. 10 shows a diagram of a system 1000 including a device 1005 that supports multicast broadcast services control channel reliability in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multicast broadcast services control channel reliability). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a base station and at the UE of a group of UEs, control signaling indicating a link between a first search space and a second search space used for a multicast broadcast service, where a first downlink control channel for the group of UEs is transmitted in the first search space and a second downlink control channel is transmitted in the second search space. The communications manager 1020 may be configured as or otherwise support a means for monitoring the first search space for a first instance of control information in the first downlink control channel and the second search space for a second instance of the control information in the second downlink control channel. The communications manager 1020 may be configured as or otherwise support a means for decoding the first instance or the second instance of the control information, or both, based on the monitoring.

By including or configuring the communications manager 1020 in accordance with examples as described herein, the device 1005 may support techniques for increasing the efficiency and reliability of repetitive PDCCH transmissions for a group of UEs. The reliability of MBS GC-PDCCH transmissions is increased by the present techniques that may include PDCCH transmissions in MBS GC-PDCCH transmissions for a group of UEs (e.g., UEs in the same MBS group). Also, described techniques may result in increased communication reliability, reduced latency, improved user experience related to reduced processing, reduced power consumption, more efficient utilization of communication resources, improved coordination between devices, longer battery life, and increased utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of multicast broadcast services control channel reliability as described herein, or the processor 1040 and the memory 1030 may be otherwise configured to perform or support such operations.

Figure 11:
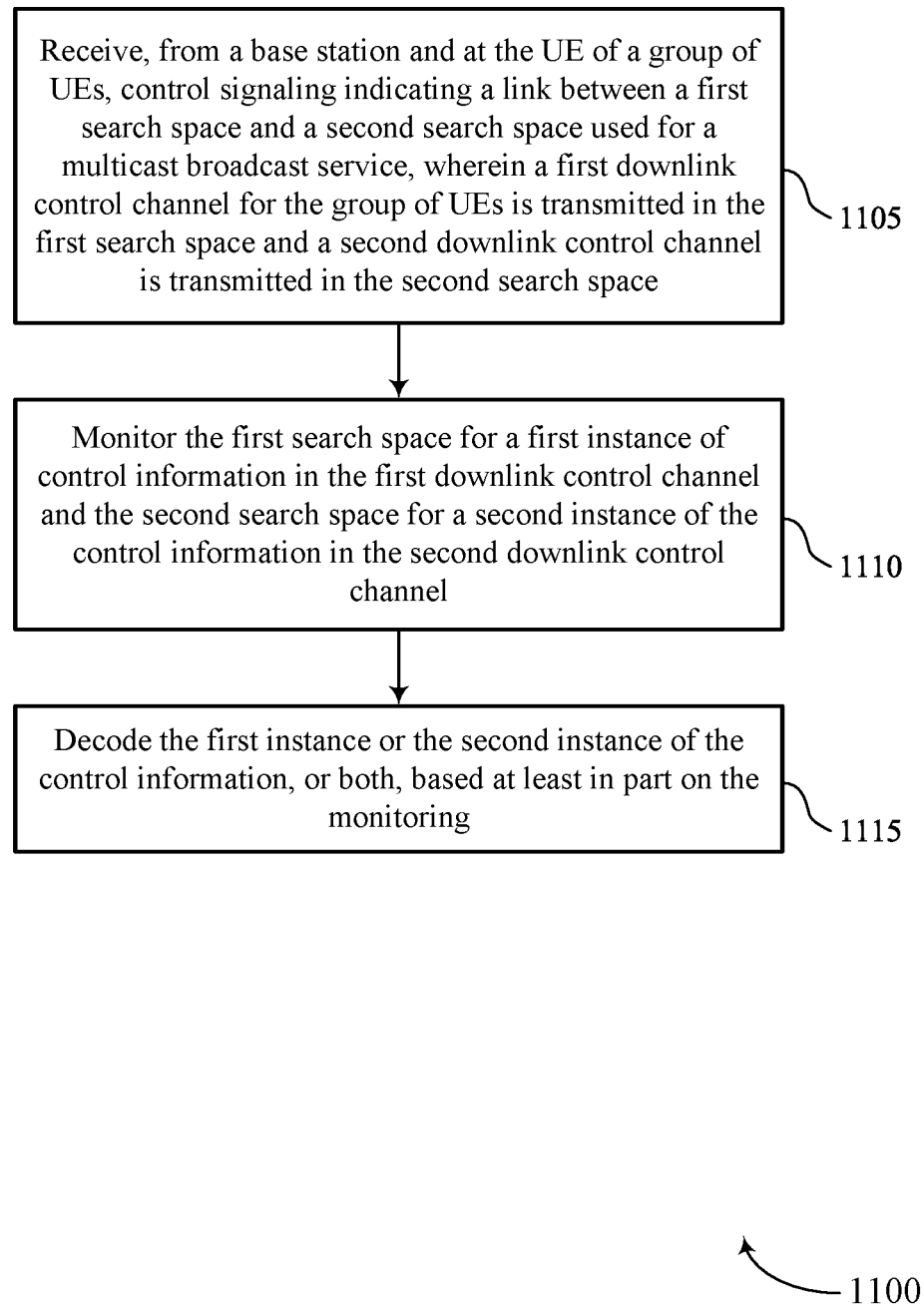
FIGS. 11 through 13 show flowcharts illustrating methods that support multicast broadcast services control channel reliability in accordance with aspects of the present disclosure.

FIG. 11 shows a flowchart illustrating a method 1100 that supports multicast broadcast services control channel reliability in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving, from a base station and at the UE of a group of UEs, control signaling indicating a link between a first search space and a second search space used for a multicast broadcast service, where a first downlink control channel for the group of UEs is transmitted in the first search space and a second downlink control channel is transmitted in the second search space. The operations of 1105 may be performed in accordance with examples as disclosed herein. In some examples, aspects of the operations of 1105 may be performed by a control manager 925 as described with reference to FIG. 9.

At 1110, the method may include monitoring the first search space for a first instance of control information in the first downlink control channel and the second search space for a second instance of the control information in the second downlink control channel. The operations of 1110 may be performed in accordance with examples as disclosed herein. In some examples, aspects of the operations of 1110 may be performed by a monitoring manager 930 as described with reference to FIG. 9.

At 1115, the method may include decoding the first instance or the second instance of the control information, or both, based on the monitoring. The operations of 1115 may be performed in accordance with examples as disclosed herein. In some examples, aspects of the operations of 1115 may be performed by a decoding manager 935 as described with reference to FIG. 9.

Figure 12:
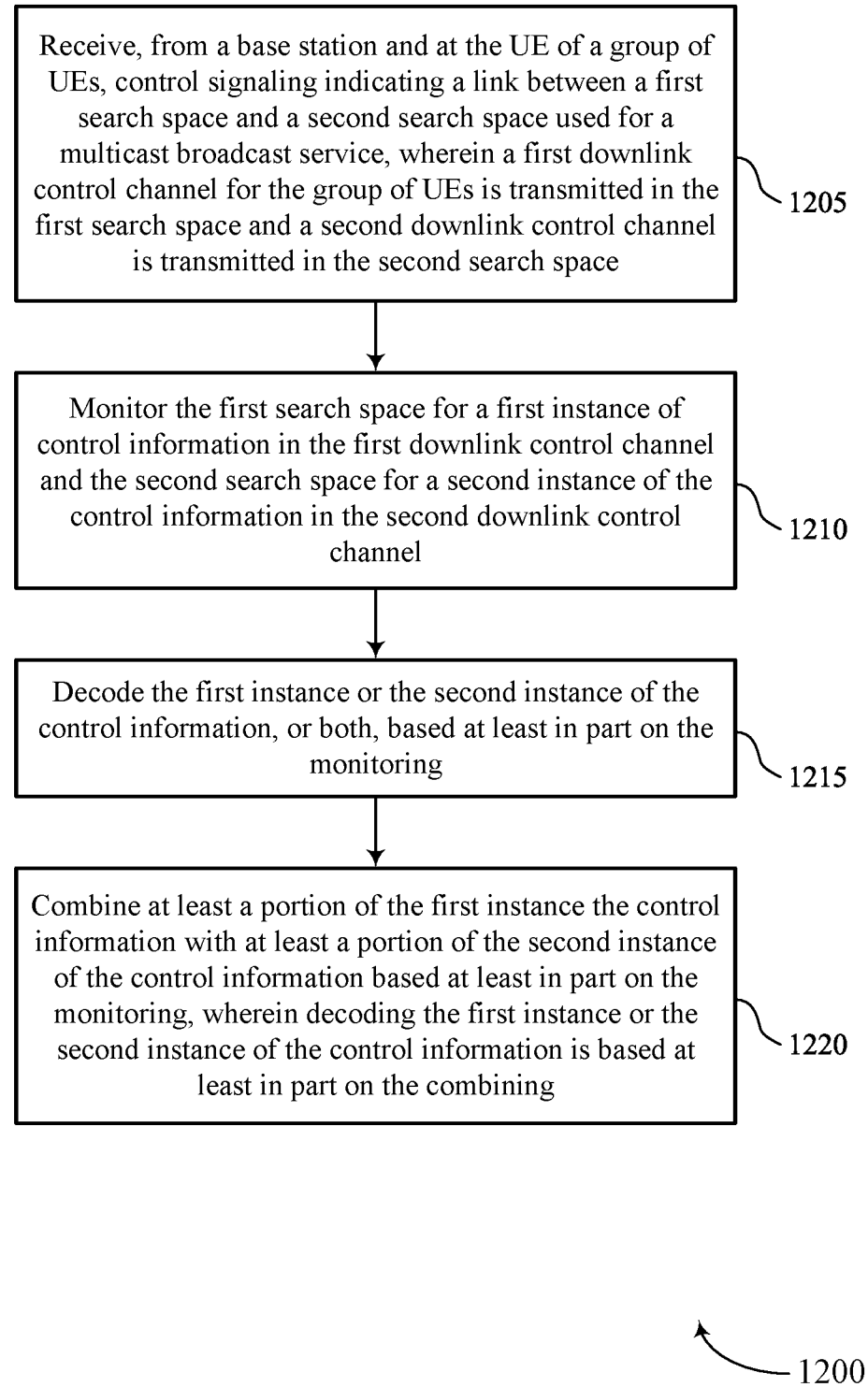

FIG. 12 shows a flowchart illustrating a method 1200 that supports multicast broadcast services control channel reliability in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving, from a base station and at the UE of a group of UEs, control signaling indicating a link between a first search space and a second search space used for a multicast broadcast service, where a first downlink control channel for the group of UEs is transmitted in the first search space and a second downlink control channel is transmitted in the second search space. The operations of 1205 may be performed in accordance with examples as disclosed herein. In some examples, aspects of the operations of 1205 may be performed by a control manager 925 as described with reference to FIG. 9.

At 1210, the method may include monitoring the first search space for a first instance of control information in the first downlink control channel and the second search space for a second instance of the control information in the second downlink control channel. The operations of 1210 may be performed in accordance with examples as disclosed herein. In some examples, aspects of the operations of 1210 may be performed by a monitoring manager 930 as described with reference to FIG. 9.

At 1215, the method may include decoding the first instance or the second instance of the control information, or both, based on the monitoring. The operations of 1215 may be performed in accordance with examples as disclosed herein. In some examples, aspects of the operations of 1215 may be performed by a decoding manager 935 as described with reference to FIG. 9.

At 1220, the method may include combining at least a portion of the first instance the control information with at least a portion of the second instance of the control information based on the monitoring, where decoding the first instance or the second instance of the control information is based on the combining. The operations of 1220 may be performed in accordance with examples as disclosed herein. In some examples, aspects of the operations of 1220 may be performed by a combining manager 940 as described with reference to FIG. 9.

Figure 13:
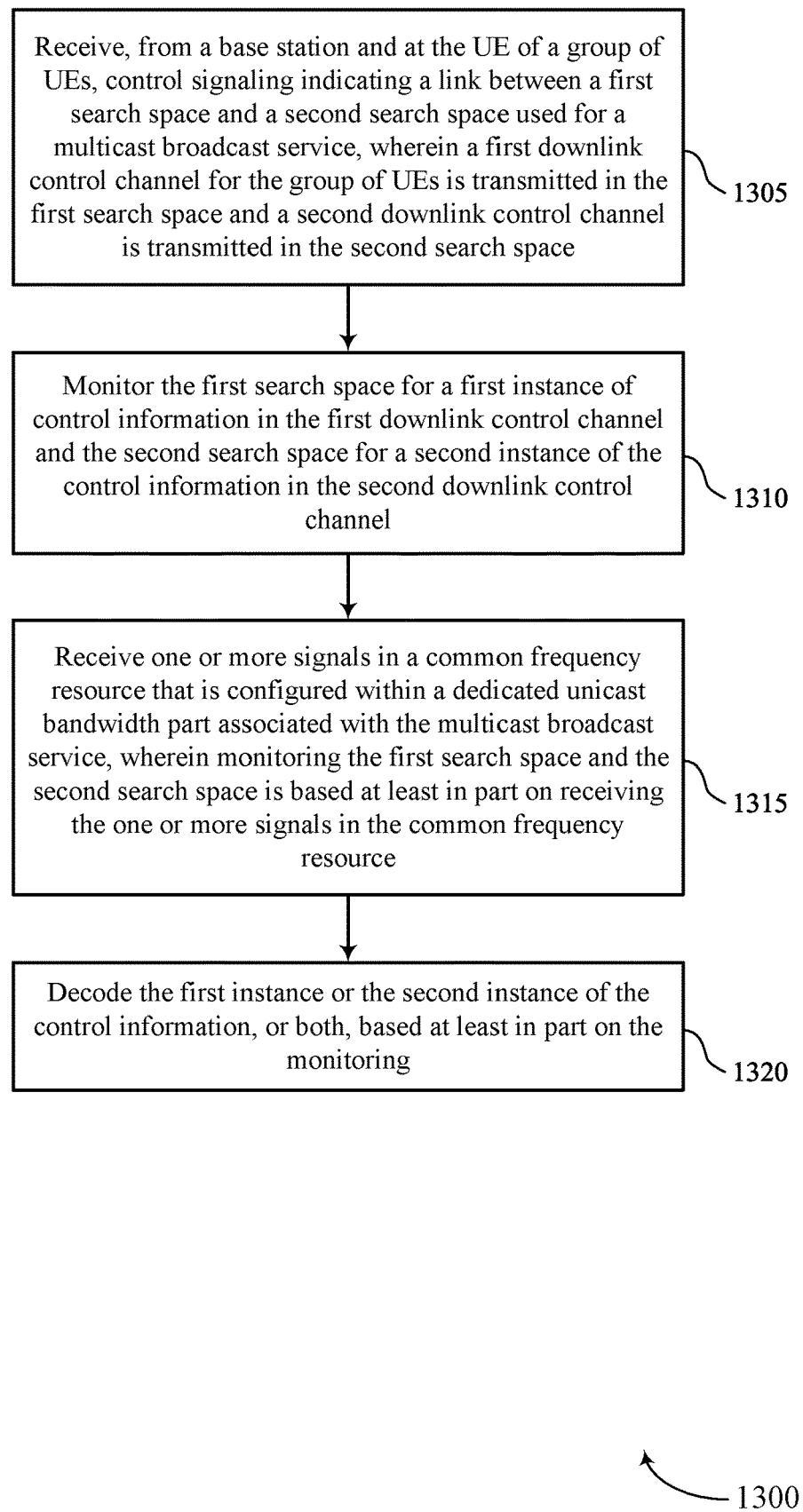

FIG. 13 shows a flowchart illustrating a method 1300 that supports multicast broadcast services control channel reliability in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving, from a base station and at the UE of a group of UEs, control signaling indicating a link between a first search space and a second search space used for a multicast broadcast service, where a first downlink control channel for the group of UEs is transmitted in the first search space and a second downlink control channel is transmitted in the second search space. The operations of 1305 may be performed in accordance with examples as disclosed herein. In some examples, aspects of the operations of 1305 may be performed by a control manager 925 as described with reference to FIG. 9.

At 1310, the method may include monitoring the first search space for a first instance of control information in the first downlink control channel and the second search space for a second instance of the control information in the second downlink control channel. The operations of 1310 may be performed in accordance with examples as disclosed herein. In some examples, aspects of the operations of 1310 may be performed by a monitoring manager 930 as described with reference to FIG. 9.

At 1315, the method may include receiving one or more signals in a common frequency resource that is configured within a dedicated unicast bandwidth part associated with the multicast broadcast service, where monitoring the first search space and the second search space is based on receiving the one or more signals in the common frequency resource. The operations of 1315 may be performed in accordance with examples as disclosed herein. In some examples, aspects of the operations of 1315 may be performed by a monitoring manager 930 as described with reference to FIG. 9.

At 1320, the method may include decoding the first instance or the second instance of the control information, or both, based on the monitoring. The operations of 1320 may be performed in accordance with examples as disclosed herein. In some examples, aspects of the operations of 1320 may be performed by a decoding manager 935 as described with reference to FIG. 9.

The following provides an overview of aspects of the present disclosure:

Aspect 1: A method for wireless communication at a UE, comprising: receiving, from a base station and at the UE of a group of UEs, control signaling indicating a link between a first search space set and a second search space set used for a multicast broadcast service, wherein a first downlink control channel for the group of UEs is transmitted in the first search space set and a second downlink control channel is transmitted in the second search space set; monitoring the first search space set for a first instance of control information in the first downlink control channel and the second search space set for a second instance of the control information in the second downlink control channel; and decoding the first instance or the second instance of the control information, or both, based at least in part on the monitoring.

Aspect 2: The method of aspect 1, further comprising: combining at least a portion of the first instance the control information with at least a portion of the second instance of the control information based at least in part on the monitoring, wherein decoding the first instance or the second instance of the control information is based at least in part on the combining.

Aspect 3: The method of any of aspects 1 through 2, further comprising: receiving one or more signals in a common frequency resource that is configured within a dedicated unicast bandwidth part associated with the multicast broadcast service, wherein monitoring the first search space set and the second search space set is based at least in part on receiving the one or more signals in the common frequency resource.

Aspect 4: The method of aspect 3, wherein the common frequency resource comprises the first search space set, the first search space set comprises a first common search space, and the first downlink control channel comprises a first group common physical downlink control channel associated with the group of UEs.

Aspect 5: The method of aspect 4, wherein the common frequency resource comprises the second search space set, the second search space set comprises a second common search space, and the second downlink control channel comprises a second group common physical downlink control channel associated with the group of UEs.

Aspect 6: The method of any of aspects 4 through 5, wherein the second search space set comprises a second common search space configured in the dedicated unicast bandwidth part, and the second downlink control channel comprises a UE-specific physical downlink control channel.

Aspect 7: The method of any of aspects 4 through 6, wherein the second search space set comprises a UE-specific search space configured in the dedicated unicast bandwidth part, and the second downlink control channel comprises a UE-specific physical downlink control channel.

Aspect 8: The method of any of aspects 4 through 7, wherein a monitoring priority of the first common search space is determined based at least in part on search space indexes of one or more type-X common search spaces or one or more UE-specific search spaces, or both, the one or more type-X common search spaces comprising at least the first common search space.

Aspect 9: The method of any of aspects 1 through 8, further comprising: receiving one or more signals in a common frequency resource that is associated with the multicast broadcast service, the common frequency resource comprising the first search space set, wherein the first downlink control channel comprises a first group common physical downlink control channel.

Aspect 10: The method of aspect 9, wherein the common frequency resource comprises the second search space set, and the second downlink control channel comprises a second group common physical downlink control channel associated with the group of UEs.

Aspect 11: The method of any of aspects 9 through 10, further comprising: receiving one or more signals in a second common frequency resource that is configured within the dedicated unicast bandwidth part, the second common frequency resource comprising the second search space set, wherein the second downlink control channel comprises a second group common physical downlink control channel.

Aspect 12: The method of any of aspects 9 through 11, wherein the second search space set comprises a second common search space configured in the dedicated unicast bandwidth part, and the second downlink control channel comprises a UE-specific physical downlink control channel.

Aspect 13: The method of any of aspects 9 through 12, wherein the second search space set comprises a UE-specific search space configured in the dedicated unicast bandwidth part, and the second downlink control channel comprises a UE-specific physical downlink control channel.

Aspect 14: The method of any of aspects 9 through 13, wherein the common frequency resource is broadcasted in a system information block to enable the UE to detect a multicast broadcast control channel, or the common frequency resource is broadcasted in the multicast control channel to enable the UE to detect a multicast broadcast traffic channel.

Aspect 15: The method of any of aspects 1 through 14, further comprising: identifying the link between the first search space set and the second search space set based at least in part on downlink control channel candidate indexes for the first search space set and the second search space set, wherein monitoring the first search space set and the second search space set is based at least in part on identifying the link.

Aspect 16: The method of any of aspects 1 through 15, further comprising: identifying the link between the first search space set and the second search space set based at least in part on control channel element indexes for the first search space set and the second search space set, wherein monitoring the first search space set and the second search space set is based at least in part on identifying the link.

Aspect 17: The method of any of aspects 1 through 16, wherein a UE group configuration included in the control signaling indicates that the first search space set and the second search space set are linked.

Aspect 18: The method of any of aspects 1 through 17, further comprising: receiving one or more signals over a downlink shared channel using parameters associated with the multicast broadcast service based at least in part on the link between the first search space set and the second search space set and the first downlink control channel comprising a group common physical downlink control channel and the second downlink control channel comprising a UE-specific physical downlink control channel.

Aspect 19: The method of aspect 18, wherein a scrambling of the downlink shared channel is based at least in part on a reference scrambling, the reference scrambling comprises a group radio network temporary identifier associated with the group common physical downlink control channel.

Aspect 20: The method of any of aspects 1 through 19, wherein the second downlink control channel comprises a same downlink control information format as the first downlink control channel.

Aspect 21: The method of any of aspects 1 through 20, wherein the group of UEs comprises a multicast broadcast services group of UEs, and each UE of the group of UEs are configured for control signaling repetition.

Aspect 22: The method of any of aspects 1 through 21, wherein the control signaling comprises radio resource control, or downlink control information, or media access control control element, or a combination thereof.

Aspect 23: The method of any of aspects 1 through 22, wherein the first search space set and the second search space set comprise a same periodicity, a same number of monitoring occasions per slot, or a same number of candidates for each aggregation level, or any combination thereof.

Aspect 24: The method of any of aspects 1 through 23, wherein the first downlink control channel and the second downlink control channel comprise a same downlink control channel candidate index, a same control channel element index, a same aggregation level, a same downlink control information payload, same downlink control information formats to monitor, same coded bits, or same search space type, or any combination thereof.

Aspect 25: An apparatus for wireless communication at a UE, comprising a processor; memory coupled with the processor; and instructions stored in the memory and executable by the processor to cause the apparatus to perform a method of any of aspects 1 through 24.

Aspect 26: An apparatus for wireless communication at a UE, comprising at least one means for performing a method of any of aspects 1 through 24.

Aspect 27: A non-transitory computer-readable medium storing code for wireless communication at a UE, the code comprising instructions executable by a processor to perform a method of any of aspects 1 through 24.

Aspect 28: A method for wireless communication at a base station, comprising: transmitting, from the base station to one or more UEs of a group of UEs, control signaling indicating a link between a first search space set and a second search space set used for a multicast broadcast service; transmitting a first downlink control channel for the group of UEs in the first search space set and a second downlink control channel in the second search space set, wherein the first search space set comprises a first instance of control information in the first downlink control channel and the second search space set comprises a second instance of the control information in the second downlink control channel.

Aspect 29: An apparatus for wireless communication at a base station, comprising a processor; memory coupled with the processor; and instructions stored in the memory and executable by the processor to cause the apparatus to perform a method of aspect 28.

Aspect 30: An apparatus for wireless communication at a base station, comprising at least one means for performing a method of aspect 28.

Aspect 31: A non-transitory computer-readable medium storing code for wireless communication at a base station, the code comprising instructions executable by a processor to perform a method of aspect 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   at least one processor; and
   at least one memory coupled with the at least one processor, with instructions stored in the at least one memory, the instructions being executable by the at least one processor, individually or in any combination, to cause the apparatus to:
   receive, from a base station and at the UE of a group of UEs, control signaling indicating a link between a first search space set and a second search space set used for a multicast broadcast service, wherein a first downlink control channel for the group of UEs is transmitted in the first search space set and a second downlink control channel is transmitted in the second search space set, and wherein the link indicates that at least one parameter associated with the second search space set is the same as at least one parameter associated with the first search space set;
   monitor the first search space set for a first instance of control information in the first downlink control channel and the second search space set for a second instance of the control information in the second downlink control channel; and
   decode the first instance or the second instance of the control information, or both, based at least in part on the monitoring.

2. The apparatus of claim 1, wherein the instructions are further executable by the at least one processor, individually or in any combination, to cause the apparatus to:
   combine at least a portion of the first instance the control information with at least a portion of the second instance of the control information based at least in part on the monitoring, wherein decoding the first instance or the second instance of the control information is based at least in part on the combining.

3. The apparatus of claim 1, wherein the instructions are further executable by the at least one processor, individually or in any combination, to cause the apparatus to:
   receive one or more signals in a common frequency resource that is configured within a dedicated unicast bandwidth part associated with the multicast broadcast service, wherein monitoring the first search space set and the second search space set is based at least in part on receiving the one or more signals in the common frequency resource.

4. The apparatus of claim 3, wherein the common frequency resource comprises the first search space set, the first search space set comprises a first common search space set, and the first downlink control channel comprises a first group common physical downlink control channel associated with the group of UEs.

5. The apparatus of claim 4, wherein the common frequency resource comprises the second search space set, the second search space set comprises a second common search space set, and the second downlink control channel comprises a second group common physical downlink control channel associated with the group of UEs.

6. The apparatus of claim 4, wherein the second search space set comprises a second common search space set configured in the dedicated unicast bandwidth part, and the second downlink control channel comprises a UE-specific physical downlink control channel.

7. The apparatus of claim 4, wherein the second search space set comprises a UE-specific search space set configured in the dedicated unicast bandwidth part, and the second downlink control channel comprises a UE-specific physical downlink control channel.

8. The apparatus of claim 4, wherein a monitoring priority of the first common search space set is determined based at least in part on search space set indexes of one or more type-X common search spaces or one or more UE-specific search spaces, or both, the one or more type-X common search spaces comprising at least the first common search space set.

9. The apparatus of claim 1, wherein the instructions are further executable by the at least one processor, individually or in any combination, to cause the apparatus to:
   receive one or more signals in a common frequency resource that is associated with the multicast broadcast service, the common frequency resource comprising the first search space set, wherein the first downlink control channel comprises a first group common physical downlink control channel.

10. The apparatus of claim 9, wherein the common frequency resource comprises the second search space set, and the second downlink control channel comprises a second group common physical downlink control channel associated with the group of UEs.

11. The apparatus of claim 9, wherein the instructions are further executable by the at least one processor, individually or in any combination, to cause the apparatus to:
    receive one or more signals in a second common frequency resource that is configured within a dedicated unicast bandwidth part, the second common frequency resource comprising the second search space set, wherein the second downlink control channel comprises a second group common physical downlink control channel.

12. The apparatus of claim 9, wherein the second search space set comprises a second common search space set configured in a dedicated unicast bandwidth part, and the second downlink control channel comprises a UE-specific physical downlink control channel.

13. The apparatus of claim 9, wherein the second search space set comprises a UE-specific search space set configured in a dedicated unicast bandwidth part, and the second downlink control channel comprises a UE-specific physical downlink control channel.

14. The apparatus of claim 9, wherein the common frequency resource is broadcasted in a system information block to enable the UE to detect a multicast broadcast control channel, or the common frequency resource is broadcasted in the multicast broadcast control channel to enable the UE to detect a multicast broadcast traffic channel.

15. The apparatus of claim 1, wherein the instructions are further executable by the at least one processor, individually or in any combination, to cause the apparatus to:
identify the link between the first search space set and the second search space set based at least in part on downlink control channel candidate indexes for the first search space set and the second search space set, wherein monitoring the first search space set and the second search space set is based at least in part on identifying the link.

16. The apparatus of claim 1, wherein the instructions are further executable by the at least one processor, individually or in any combination, to cause the apparatus to:
identify the link between the first search space set and the second search space set based at least in part on control channel element indexes for the first search space set and the second search space set, wherein monitoring the first search space set and the second search space set is based at least in part on identifying the link.

17. The apparatus of claim 1, wherein a UE group configuration included in the control signaling indicates that the first search space set and the second search space set are linked.

18. The apparatus of claim 1, wherein the instructions are further executable by the at least one processor, individually or in any combination, to cause the apparatus to:
receive one or more signals over a downlink shared channel using parameters associated with the multicast broadcast service based at least in part on the link between the first search space set and the second search space set and the first downlink control channel comprising a group common physical downlink control channel and the second downlink control channel comprising a UE-specific physical downlink control channel.

19. The apparatus of claim 18, wherein:
a scrambling of the downlink shared channel is based at least in part on a reference scrambling, and
the reference scrambling comprises a group radio network temporary identifier associated with the group common physical downlink control channel.

20. The apparatus of claim 1, wherein the second downlink control channel comprises a same downlink control information format as the first downlink control channel.

21. The apparatus of claim 1, wherein the group of UEs comprises a multicast broadcast services group of UEs, and each UE of the group of UEs are configured for control signaling repetition.

22. The apparatus of claim 1, wherein the control signaling comprises radio resource control, or downlink control information, or media access control-control element, or a combination thereof.

23. The apparatus of claim 1, wherein the first search space set and the second search space set comprise a same periodicity, a same number of monitoring occasions per slot, or a same number of candidates for each aggregation level, or any combination thereof.

24. The apparatus of claim 1, wherein the first downlink control channel and the second downlink control channel comprise a same downlink control channel candidate index, a same control channel element index, a same aggregation level, a same downlink control information payload, same downlink control information formats to monitor, same coded bits, or same search space type, or any combination thereof.

25. A method for wireless communication at a user equipment (UE), comprising:
receiving, from a base station and at the UE of a group of UEs, control signaling indicating a link between a first search space set and a second search space set used for a multicast broadcast service, wherein a first downlink control channel for the group of UEs is transmitted in the first search space set and a second downlink control channel is transmitted in the second search space set, and wherein the link indicates that at least one parameter associated with the second search space set is the same as at least one parameter associated with the first search space set;
monitoring the first search space set for a first instance of control information in the first downlink control channel and the second search space set for a second instance of the control information in the second downlink control channel; and
decoding the first instance or the second instance of the control information, or both, based at least in part on the monitoring.

26. The method of claim 25, further comprising:
combining at least a portion of the first instance the control information with at least a portion of the second instance of the control information based at least in part on the monitoring, wherein decoding the first instance or the second instance of the control information is based at least in part on the combining.

27. The method of claim 25, further comprising:
receiving one or more signals in a common frequency resource that is configured within a dedicated unicast bandwidth part associated with the multicast broadcast service, wherein monitoring the first search space set and the second search space set is based at least in part on receiving the one or more signals in the common frequency resource.

28. The method of claim 27, wherein the common frequency resource comprises the first search space set, the first search space set comprises a first common search space set, and the first downlink control channel comprises a first group common physical downlink control channel associated with the group of UEs.

29. An apparatus for wireless communication at a user equipment (UE), comprising:
means for receiving, from a base station and at the UE of a group of UEs, control signaling indicating a link between a first search space set and a second search space set used for a multicast broadcast service, wherein a first downlink control channel for the group of UEs is transmitted in the first search space set and a second downlink control channel is transmitted in the second search space set, and wherein the link indicates that at least one parameter associated with the second search space set is the same as at least one parameter associated with the first search space set;

means for monitoring the first search space set for a first instance of control information in the first downlink control channel and the second search space set for a second instance of the control information in the second downlink control channel; and means for decoding the first instance or the second instance of the control information, or both, based at least in part on the monitoring.

30. A non-transitory computer-readable medium storing code for wireless communication at a user equipment (UE), the code comprising instructions executable by a processor to:

receive, from a base station and at the UE of a group of UEs, control signaling indicating a link between a first search space set and a second search space set used for a multicast broadcast service, wherein a first downlink control channel for the group of UEs is transmitted in the first search space set and a second downlink control channel is transmitted in the second search space set, and wherein the link indicates that at least one parameter associated with the second search space set is the same as at least one parameter associated with the first search space set;

monitor the first search space set for a first instance of control information in the first downlink control channel and the second search space set for a second instance of the control information in the second downlink control channel; and decode the first instance or the second instance of the control information, or both, based at least in part on the monitoring.

* * * * *